(12) United States Patent
Takeda et al.

(10) Patent No.: US 11,985,643 B2
(45) Date of Patent: May 14, 2024

(54) DCI DESIGN FOR MULTI-CROSS CARRIER SCHEDULING

(71) Applicant: QUALCOMM Incorporated, San Diego, CA (US)

(72) Inventors: Kazuki Takeda, Tokyo (JP); Wanshi Chen, San Diego, CA (US); Peter Gaal, San Diego, CA (US); Xiaoxia Zhang, San Diego, CA (US); Huilin Xu, Temecula, CA (US); Mostafa Khoshnevisan, San Diego, CA (US); Tao Luo, San Diego, CA (US); Alberto Rico Alvarino, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 100 days.

(21) Appl. No.: 17/224,011

(22) Filed: Apr. 6, 2021

(65) Prior Publication Data

US 2021/0321400 A1 Oct. 14, 2021

Related U.S. Application Data

(60) Provisional application No. 63/008,619, filed on Apr. 10, 2020.

(51) Int. Cl.
*H04W 72/0453* (2023.01)
*H04W 72/1273* (2023.01)
*H04W 72/23* (2023.01)

(52) U.S. Cl.
CPC ... *H04W 72/0453* (2013.01); *H04W 72/1273* (2013.01); *H04W 72/23* (2023.01)

(58) Field of Classification Search
None
See application file for complete search history.

(56) References Cited

U.S. PATENT DOCUMENTS

| | | | |
|---|---|---|---|
| 2014/0133370 A1 | 5/2014 | Chen et al. | |
| 2017/0135127 A1 | 5/2017 | Nogami et al. | |
| 2018/0110084 A1* | 4/2018 | Dinan | H04W 52/242 |
| 2018/0249497 A1* | 8/2018 | Noh | H04L 5/005 |
| 2019/0246378 A1* | 8/2019 | Islam | H04L 1/1819 |
| 2019/0313377 A1* | 10/2019 | Abdoli | H04W 72/042 |
| 2019/0363843 A1 | 11/2019 | Gordaychik | |
| 2020/0008182 A1* | 1/2020 | Abdoli | H04L 1/0046 |
| 2020/0145967 A1* | 5/2020 | Park | H04W 72/042 |
| 2020/0267511 A1* | 8/2020 | Abdoli | H04L 5/0094 |

(Continued)

OTHER PUBLICATIONS

International Search Report and Written Opinion—PCT/US2021/026263—ISA/EPO—dated Jul. 23, 2021.

*Primary Examiner* — Phirin Sam
(74) *Attorney, Agent, or Firm* — Procopio, Cory, Hargreaves & Savitch LLP

(57) ABSTRACT

A configuration to enable a base station to schedule cross carrier scheduling of uplink and/or downlink transmissions using a DCI. The apparatus transmits, to a UE, a PDCCH including a cross carrier schedule. The PDCCH comprises DCI configured to schedule an uplink transmission or a downlink transmission. The DCI includes at least one FDRA field indicating RBs for the uplink transmission or the downlink transmission. The apparatus communicates with the UE based on the cross carrier schedule configured by the DCI.

24 Claims, 17 Drawing Sheets

(56) References Cited

U.S. PATENT DOCUMENTS

| | | |
|---|---|---|
| 2020/0296758 A1* | 9/2020 | Li ........................... H04L 5/001 |
| 2020/0313833 A1* | 10/2020 | Yi ........................... H04L 5/001 |
| 2020/0337029 A1* | 10/2020 | Yi ....................... H04W 72/042 |
| 2020/0396760 A1* | 12/2020 | Yi ........................ H04L 1/1864 |
| 2021/0160879 A1* | 5/2021 | Lin ....................... H04L 1/0003 |
| 2021/0392627 A1* | 12/2021 | Kim ...................... H04W 72/23 |
| 2022/0095304 A1* | 3/2022 | Muruganathan ....... H04B 7/024 |
| 2022/0200748 A1* | 6/2022 | Yao ....................... H04L 1/1812 |
| 2023/0035066 A1* | 2/2023 | Bae ................... H04W 72/1268 |
| 2023/0044495 A1* | 2/2023 | Harada ................. H04W 48/18 |
| 2023/0091207 A1* | 3/2023 | Lee ....................... H04L 5/0094 |
| | | 370/330 |
| 2023/0156761 A1* | 5/2023 | Papasakellariou .. H04W 72/535 |
| | | 370/329 |

* cited by examiner

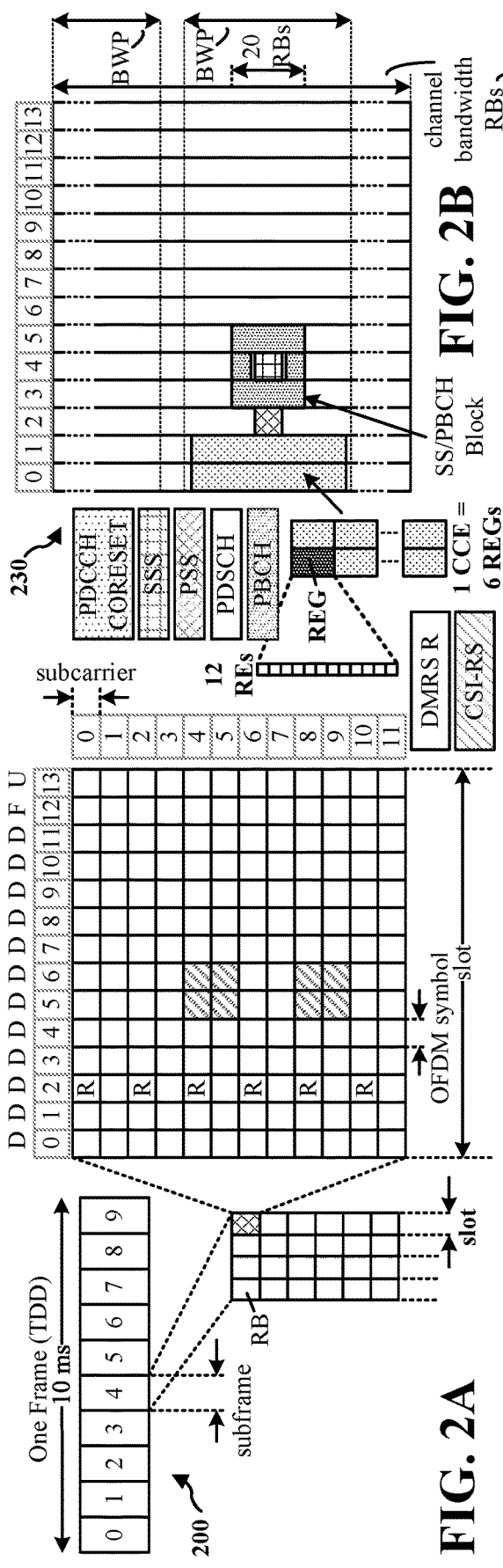
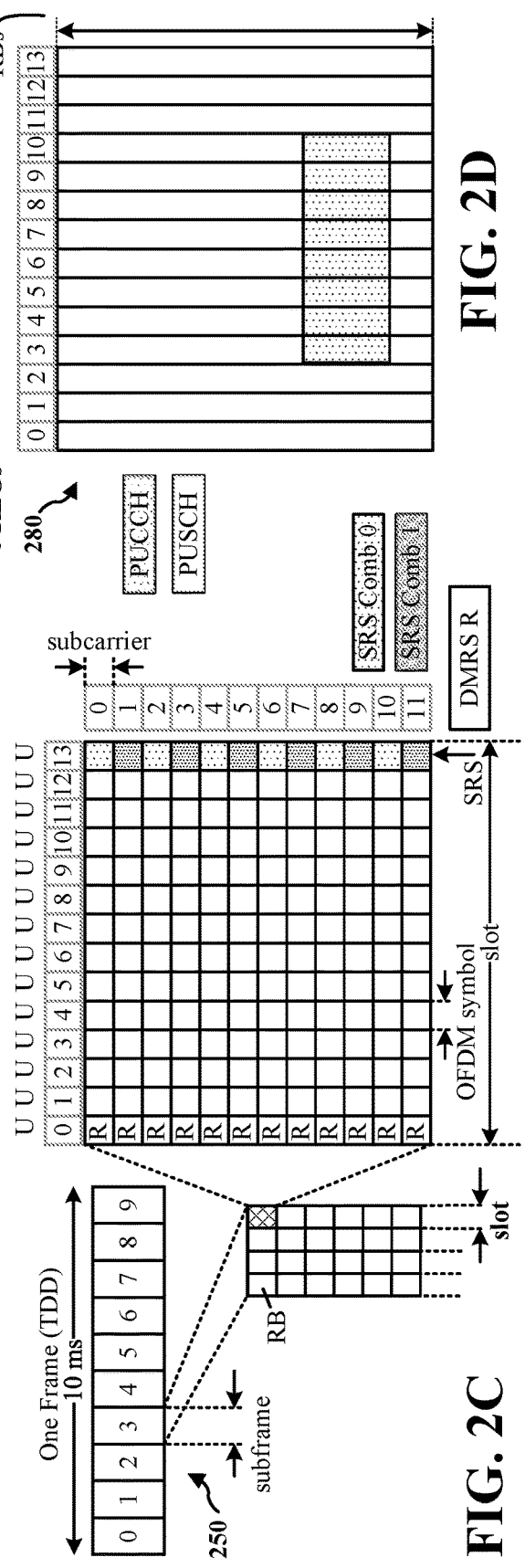
FIG. 2A  FIG. 2B  FIG. 2C  FIG. 2D

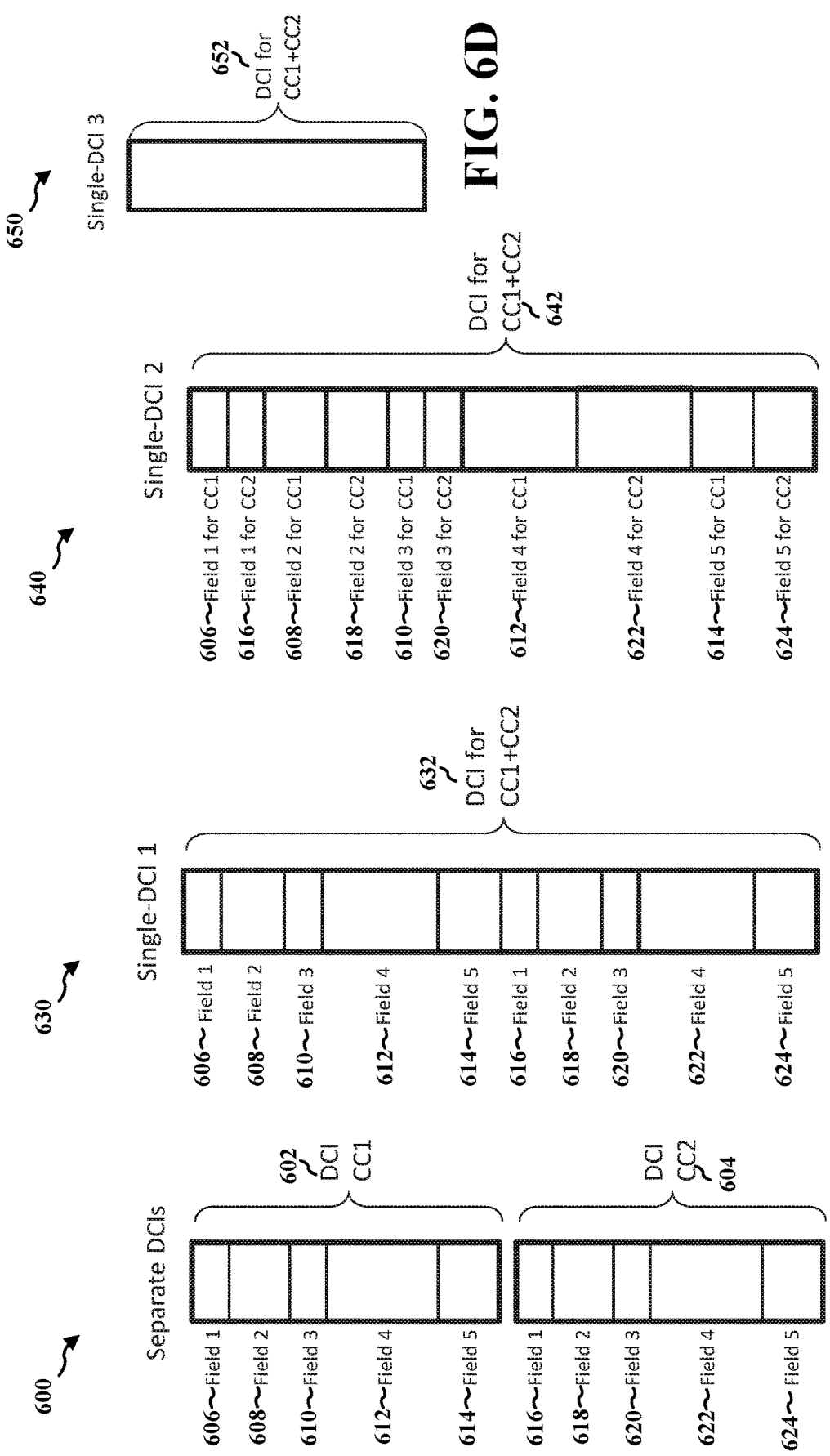

| | DCI 1_1 702 | DCI 1_2 704 |
|---|---|---|
| DCI format identifier | 1 | 1 |
| CIF | 0, 3 | 0 – 3 |
| BWP indicator | 0 – 2 | 0 – 2 |
| Frequency-domain RA | 0 – 18 | 0 – 18 |
| Time-domain RA | 0 – 4 | 0 – 4 |
| VRB-to-PRB | 0, 1 | 0, 1 |
| PRB bundling size | 0, 1 | 0, 1 |
| Rate-matching indicator | 0 – 2 | 0 – 2 |
| ZP-CSI-RS indicator | 0 – 2 | 0 – 2 |
| MCS for TB1 | 5 | 5 |
| NDI for TB1 | 1 | 1 |
| RV for TB1 | 2 | 0 – 2 |
| MCS for TB2 | 5 | n/a |
| NDI for TB2 | 1 | n/a |
| RV for TB2 | 2 | n/a |
| HARQ process number | 4 | 0 – 4 |

| | DCI 1_1 702 | DCI 1_2 704 |
|---|---|---|
| DAI | 0, 2, 4, 6 | 0, 1, 2, 4 |
| TPC command for PUCCH | 2 | 2 |
| PUCCH resource indicator | 3 | 0 – 3 |
| PDSCH-to-HARQ_indicator | 0 – 3 | 0 – 3 |
| One shot HARQ request | 0, 1 | n/a |
| PDSCH group index | 0, 1 | n/a |
| New feedback indicator | 0 – 2 | n/a |
| No. of PDSCH groups | 0 – 1 | n/a |
| Antenna port(s) | 4 – 6 | 0, 4 – 6 |
| TCI | 0, 3 | 0 – 3 |
| SRS request | 2, 3 | 0 – 3 |
| CBGTI | 0, 2, 4, 8 | n/a |
| CBGFI | 0, 1 | n/a |
| DMRS seq init | 0, 1 | 0, 1 |
| Priority indicator | 0, 1 | 0, 1 |
| ChannelAccess-CPext | 0 – 4 | n/a |
| Min scheduling offset | 0, 1 | n/a |
| SCell dormancy indicator | 0 – 5 | n/a |

FIG. 7

| | DCI 1_1 702 | DCI 1_2 704 | For joint-CC scheduling |
|---|---|---|---|
| DCI format identifier | 1 | 1 | Joint field |
| CIF | 0, 3 | 0 – 3 | |
| BWP indicator | 0 – 2 | 0 – 2 | |
| Frequency-domain RA | 0 – 18 | 0 – 18 | Alt.1: Separate fields 802 / Alt.2: Joint field |
| Time-domain RA | 0 – 4 | 0 – 4 | |
| VRB-to-PRB | 0, 1 | 0, 1 | |
| PRB bundling size | 0, 1 | 0, 1 | |
| Rate-matching indicator | 0 – 2 | 0 – 2 | |
| ZP-CSI-RS indicator | 0 – 2 | 0 – 2 | |
| MCS for TB1 | 5 | 5 | |
| NDI for TB1 | 1 | 1 | |
| RV for TB1 | 2 | 0 – 2 | |
| MCS for TB2 | 5 | n/a | |
| NDI for TB2 | 1 | n/a | |
| RV for TB2 | 2 | n/a | |
| HARQ process number | 4 | 0 – 4 | Joint field as long as NDI is separate |

| | DCI 1_1 702 | DCI 1_2 704 | Joint scheduling |
|---|---|---|---|
| DAI | 0, 2, 4, 6 | 0, 1, 2, 4 | |
| TPC command for PUCCH | 2 | 2 | |
| PUCCH resource indicator | 3 | 0 – 3 | |
| PDSCH-to-HARQ_indicator | 0 – 3 | 0 – 3 | Single field works |
| One shot HARQ request | 0, 1 | n/a | |
| PDSCH group index | 0, 1 | n/a | |
| New feedback indicator | 0 – 2 | n/a | |
| No. of PDSCH groups | 0 – 1 | n/a | |
| Antenna port(s) | 4 – 6 | 0, 4 – 6 | |
| TCI | 0, 3 | 0 – 3 | |
| SRS request | 2, 3 | 0 – 3 | Alt.1: Separate fields / Alt.2: Joint field |
| CBGTI | 0, 2, 4, 8 | n/a | |
| CBGFI | 0, 1 | n/a | |
| DMRS seq init | 0, 1 | 0, 1 | |
| Priority indicator | 0, 1 | 0, 1 | |
| ChannelAccess-CPext | 0 – 4 | n/a | Single field works |
| Min scheduling offset | 0, 1 | n/a | Alt.1: Separate fields, Alt.2: joint field |
| SCell dormancy indicator | 0 – 5 | n/a | Already for multiple CCs |

FIG. 8

DCI DESIGN FOR MULTI-CROSS CARRIER SCHEDULING

CROSS REFERENCE TO RELATED APPLICATION(S)

This application claims the benefit of U.S. Provisional Application Ser. No. 63/008,619, entitled "DCI Design for Multi-Cross Carrier Scheduling" and filed on Apr. 10, 2020, which is expressly incorporated by reference herein in its entirety.

BACKGROUND

Technical Field

The present disclosure relates generally to communication systems, and more particularly, to a configuration for downlink control information (DCI) design for multi-cross carrier scheduling.

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided. The apparatus may be a device at a base station. The device may be a processor and/or a modem at a base station or the base station itself. The apparatus transmits, to a user equipment (UE), a physical downlink control channel (PDCCH) including a cross carrier schedule, the PDCCH comprising downlink control information (DCI) configured to schedule the uplink transmission or a downlink transmission. The DCI including at least one frequency domain resource allocation (FDRA) field indicating resource blocks (RBs) for the uplink transmission or the downlink transmission. The apparatus communicates with the UE based on the cross carrier schedule configured by the DCI.

In an aspect of the disclosure, a method, a computer-readable medium, and an apparatus are provided. The apparatus may be a device at a UE. The device may be a processor and/or a modem at a UE or the UE itself. The apparatus receives, from a base station, a physical downlink control channel (PDCCH) including a cross carrier schedule, the PDCCH comprising downlink control information (DCI) configured to schedule an uplink transmission or a downlink transmission. The DCI including at least one frequency domain resource allocation (FDRA) field indicting resource blocks (RBs) for the uplink transmission or the downlink transmission. The apparatus communicates with the base station based on the cross carrier schedule configured by the DCI.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIG. 2A is a diagram illustrating an example of a first frame, in accordance with various aspects of the present disclosure.

FIG. 2B is a diagram illustrating an example of DL channels within a subframe, in accordance with various aspects of the present disclosure.

FIG. 2C is a diagram illustrating an example of a second frame, in accordance with various aspects of the present disclosure.

FIG. 2D is a diagram illustrating an example of UL channels within a subframe, in accordance with various aspects of the present disclosure.

FIGS. 6A-6D are diagrams illustrating examples of DCI designs.

FIG. 7 is a diagram illustrating an example of DCI formats for scheduling PDSCH.

FIG. 8 is a diagram illustrating an example of DCI format for cross carrier scheduling.

DETAILED DESCRIPTION

Figure 1:
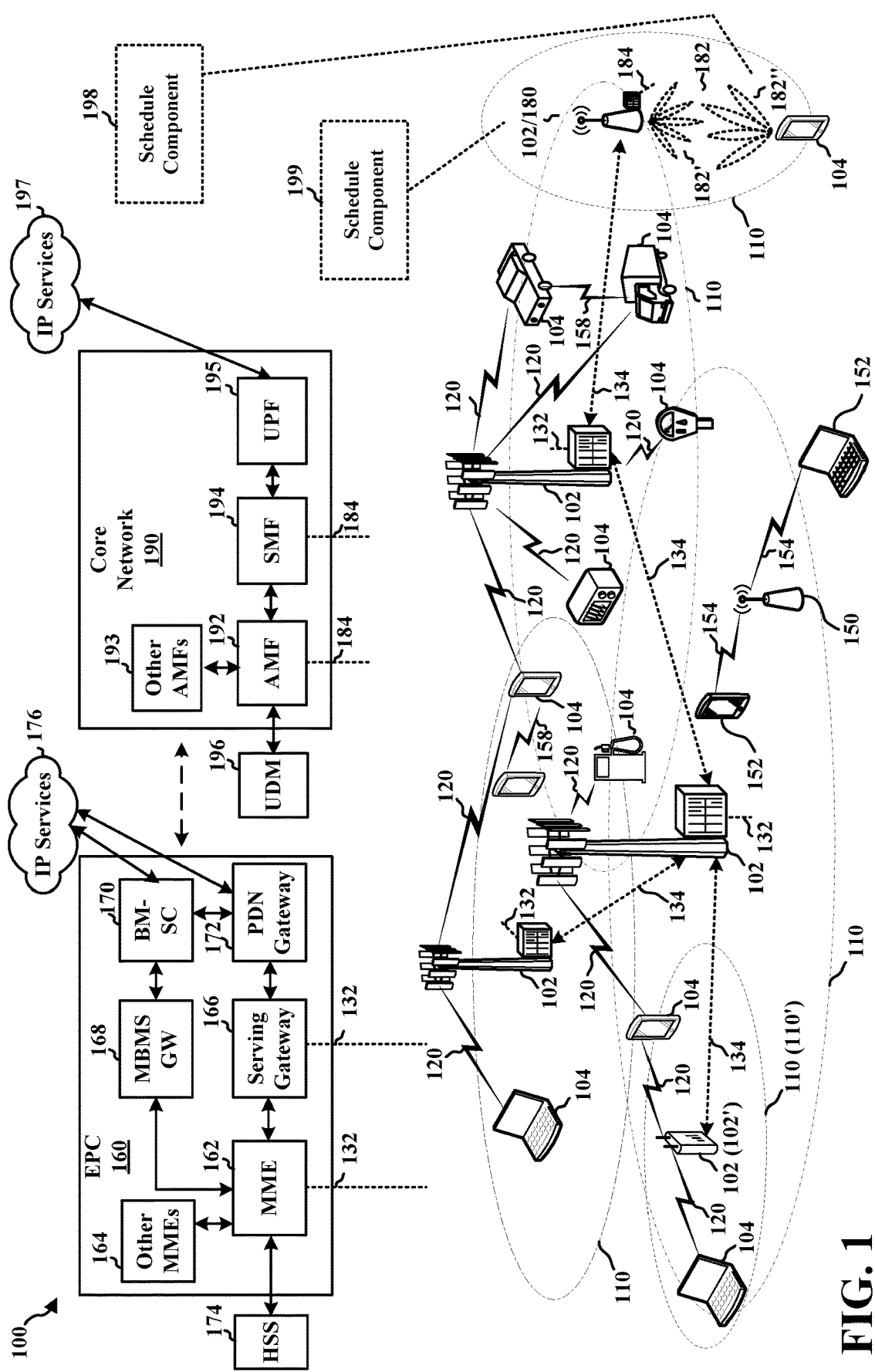
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., S1 interface). The base stations 102 configured for 5G NR (collectively referred to as Next Generation RAN (NG-RAN)) may interface with core network 190 through second backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over third backhaul links 134 (e.g., X2 interface). The first backhaul links 132, the second backhaul links 184, and the third backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, WiMedia, Bluetooth, ZigBee, Wi-Fi based on the Institute of Electrical and Electronics Engineers (IEEE) 802.11 standard, LTE, or NR.

The wireless communications system may further include a Wi-Fi access point (AP) 150 in communication with Wi-Fi stations (STAs) 152 via communication links 154, e.g., in a 5 GHz unlicensed frequency spectrum or the like. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same unlicensed frequency spectrum (e.g., 5 GHz, or the like) as used by the Wi-Fi AP 150. The small cell 102', employing NR in an unlicensed frequency spectrum, may boost coverage to and/or increase capacity of the access network.

The electromagnetic spectrum is often subdivided, based on frequency/wavelength, into various classes, bands, channels, etc. In 5GNR, two initial operating bands have been identified as frequency range designations FR1 (410 MHz-7.125 GHz) and FR2 (24.25 GHz-52.6 GHz). The frequencies between FR1 and FR2 are often referred to as mid-band frequencies. Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, or may be within the EHF band.

A base station 102, whether a small cell 102' or a large cell (e.g., macro base station), may include and/or be referred to as an eNB, gNodeB (gNB), or another type of base station. Some base stations, such as gNB 180 may operate in a traditional sub 6 GHz spectrum, in millimeter wave frequencies, and/or near millimeter wave frequencies in communication with the UE 104. When the gNB 180 operates in millimeter wave or near millimeter wave frequencies, the gNB 180 may be referred to as a millimeter wave base station. The millimeter wave base station 180 may utilize beamforming 182 with the UE 104 to compensate for the path loss and short range. The base station 180 and the UE 104 may each include a plurality of antennas, such as antenna elements, antenna panels, and/or antenna arrays to facilitate the beamforming.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include an Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a Packet Switch (PS) Streaming (PSS) Service, and/or other IP services.

The base station may include and/or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Referring again to FIG. 1, in certain aspects, the UE 104 may be configured to receive a cross carrier schedule that schedules uplink transmission or downlink transmission on more than one cell. For example, the UE 104 may comprise a schedule component 198 configured to receive a cross carrier schedule that schedules uplink transmission or downlink transmission on more than one cell. The UE 104 receives, from a base station 180, a PDCCH including a cross carrier schedule. The PDCCH comprising DCI configured to schedule the uplink transmission or the downlink transmission on more than one cell. The UE 104 communicates with the base station 180 based on the cross carrier schedule configured by the DCI.

Referring again to FIG. 1, in certain aspects, the base station 180 may be configured to configure a cross carrier schedule of an uplink transmission or a downlink transmission on more than one cell. For example, the base station 180 may comprise a schedule component 199 configured to configure the cross carrier schedule of the uplink transmission or the downlink transmission on more than one cell. The base station 180 configures PDCCH including a cross carrier schedule of an uplink or a downlink transmission on more than one cell. The base station 180 transmits, to a UE, the PDCCH including the cross carrier schedule. The PDCCH comprising DCI configured to schedule the uplink or the downlink transmission. The base station 180 communicates with the UE based on the cross carrier schedule configured by the DCI.

Although the following description may be focused on 5G NR, the concepts described herein may be applicable to other similar areas, such as LTE, LTE-A, CDMA, GSM, and other wireless technologies.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 1 (with all UL). While subframes 3, 4 are shown with slot formats 1, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

Other wireless communication technologies may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. The symbols on DL may be cyclic prefix (CP) orthogonal frequency division multiplexing (OFDM) (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the slot configuration and the numerology. For slot configuration 0, different numerologies μ 0 to 4 allow for 1, 2, 4, 8, and 16 slots, respectively, per subframe. For slot configuration 1, different numerologies 0 to 2 allow for 2, 4, and 8 slots, respectively, per subframe. Accordingly, for slot configuration 0 and numerology μ, there are 14 symbols/slot and $2^\mu$ slots/subframe. The subcarrier spacing and symbol length/duration are a function of the numerology. The subcarrier spacing may be equal to $2^\mu * 15$ kHz, where μ is the numerology 0 to 4. As such, the numerology μ=0 has a subcarrier spacing of 15 kHz and the numerology μ=4 has a subcarrier spacing of 240 kHz. The symbol length/duration is inversely related to the subcarrier spacing. FIGS. 2A-2D provide an example of slot configuration 0 with 14 symbols per slot and numerology μ=2 with 4 slots per subframe. The slot duration is 0.25 ms, the subcarrier spacing is 60 kHz, and the symbol duration is approximately 16.67 μs. Within a set of frames, there may be one or more different bandwidth parts (BWPs) (see FIG. 2B) that are frequency division multiplexed. Each BWP may have a particular numerology.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as R for one particular configuration, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The PDCCH carries DCI within one or more control channel elements (CCEs) (e.g., 1, 2, 4, 8, or 16 CCEs), each CCE including six RE groups (REGs), each REG including 12 consecutive REs in an OFDM symbol of an RB. A PDCCH within one BWP may be referred to as a control resource set (CORESET). A UE is configured to monitor PDCCH candidates in a PDCCH search space (e.g., common search space, UE-specific search space) during PDCCH monitoring occasions on the CORESET, where the PDCCH candidates have different DCI formats and different aggregation levels. Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DM-RS.

The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARD) acknowledgment (ACK) (HARQ-ACK) information (ACK/negative ACK (NACK)) feedback. The PUSCH carries data, and may additionally be used to carry a buffer status report (BSR), a power headroom report (PHR), and/or UCI.

Figure 3:
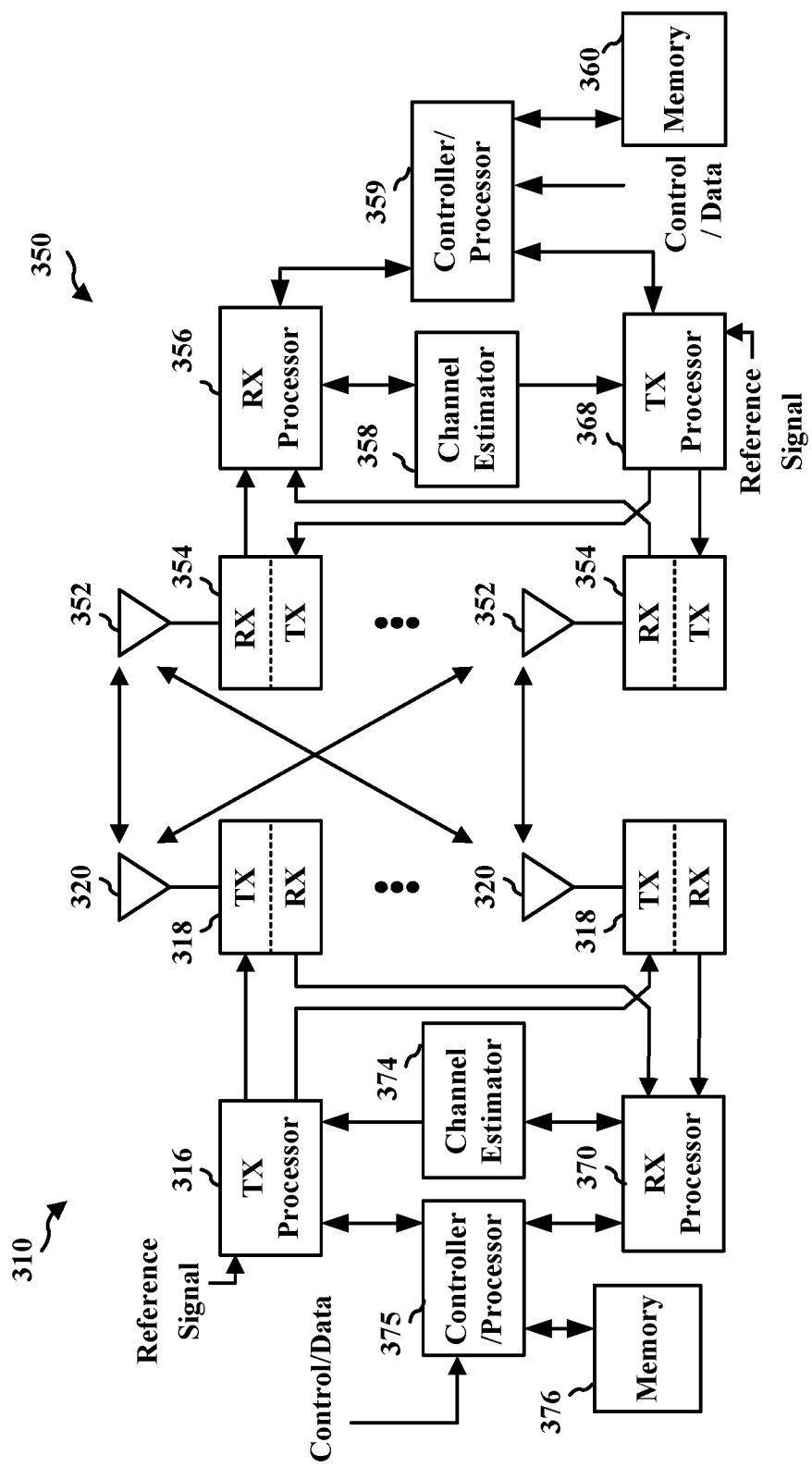
FIG. 3 is a diagram illustrating an example of a base station and user equipment (UE) in an access network.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318 TX. Each transmitter 318 TX may modulate an RF carrier with a respective spatial stream for transmission.

At the UE 350, each receiver 354 RX receives a signal through its respective antenna 352. Each receiver 354 RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

At least one of the TX processor 368, the RX processor 356, and the controller/processor 359 may be configured to perform aspects in connection with 198 of FIG. 1.

At least one of the TX processor 316, the RX processor 370, and the controller/processor 375 may be configured to perform aspects in connection with 199 of FIG. 1.

Dynamic spectrum sharing (DSS) allows for both LTE and NR in the same frequency band and is configured to dynamically allocate spectrum resources, based on user demand, between LTE and NR. In wireless systems that operate LTE and NR, the LTE carrier may be shared between LTE UEs and NR UEs in a dynamic manner, such that the LTE carrier may be known as the DSS carrier. The NR carrier is not shared with LTE UEs, and may be known as the non-DSS carrier. The NR carrier and LTE carrier may utilize carrier aggregation to configure an NR UE. Since the LTE carrier is shared between LTE UEs and NR UEs, the available resources may not be sufficient to meet demand. As such, improving the manner in which DSS operates to allow for PDCCH enhancements to improve the spectral efficiency between LTE and NR is desirable.

Aspects provided herein provide a configuration to configure a cross carrier schedule of uplink transmission or downlink transmission on more than one cell. For example, a base station may configure an enhanced PDCCH to include a cross carrier schedule for uplink transmission or downlink transmission on more than one cell. In some aspects, the enhanced PDCCH, associated with a first cell, may be configured to schedule PDSCH or PUSCH for a second cell. In some aspects, the enhanced PDCCH may schedule the cross carrier schedule on more than one cell using a single DCI.

Figures 4A, 4B:
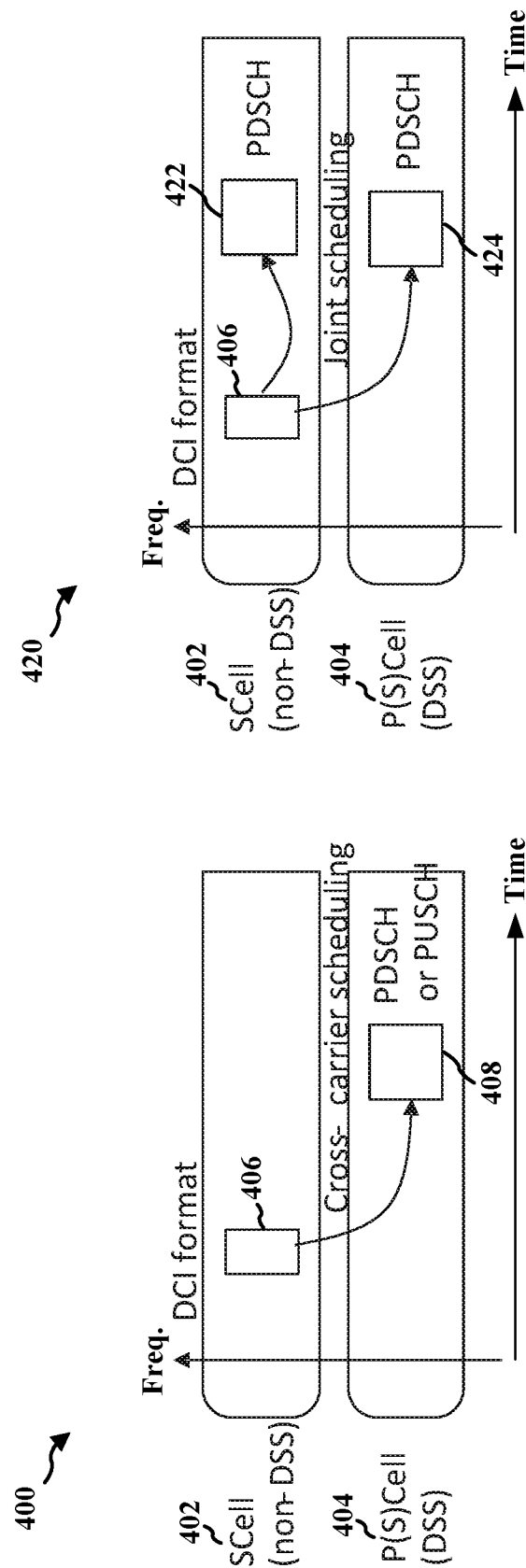
FIGS. 4A-4B are diagrams illustrating examples of PDCCH enhancements.

FIGS. 4A-4B are examples 400, 420 of PDCCH enhancements. The example 400 is a PDCCH enhancement including a cross carrier scheduling. The example 420 is a PDCCH enhancement including a joint scheduling. In the aspects of FIGS. 4A and 4B, the LTE carrier may be a PCell or a primary secondary cell (PSCell) 404, denoted as a combined terminology P(S)Cell hereafter, which is also the DSS carrier, while the NR carrier may be a SCell 402, which is the non-DSS carrier. The terms PSCell and P(S)Cell may be used interchangeably. In some aspects, the LTE carrier may be a PCell. The PDCCH 406 of the SCell 402 may be configured for cross carrier scheduling, whereby the PDCCH 406 of the SCell 402 is configured to schedule a PDSCH or a PUSCH 408 on the P(S)Cell 404. As used herein, cross carrier scheduling refers to a scheduling where a message transmitted on one carrier, such as PDCCH 406, schedules a transmission on another carrier, such as PDSCH/PUSCH 408.

With reference to FIG. 4B, the PDCCH 406 of the SCell 402 may be configured for joint scheduling, whereby the PDCCH 406 of the SCell 402 may schedule a PDSCH 422, 424 on multiple cells using a single DCI (not shown). The PDCCH 406 may carry the single DCI used to schedule the PDSCH 422, 424 on multiple cells. As illustrated in the example of FIG. 4B, joint scheduling is understood to include cross carrier scheduling, since PDCCH 406 schedules PDSCH 424 on a carrier different from the carrier of PDCCH 406. However, in joint scheduling, in addition to PDSCH 424 on the different carrier, PDCCH 406 also schedules PDSCH 422 on the same carrier. In some aspects, a PDCCH of a P(S)Cell may schedule a PDSCH 422, 424 on multiple cells using a single DCI. Conventionally, one data channel is scheduled by a corresponding DCI, even if there is some specification indicating that multiple data channels may be scheduled one by one DCI, such scheduling may be within one carrier. At least an advantage of the present disclosure is that the single DCI may schedule data channels on multiple carriers at one time, which may improve spectral efficiency. The number of cells that may be scheduled at once may comprise 2 cells. In addition, the increase in the DCI size may be minimized, such that the total PDCCH blind decoding budget is unchanged.

Figure 5:
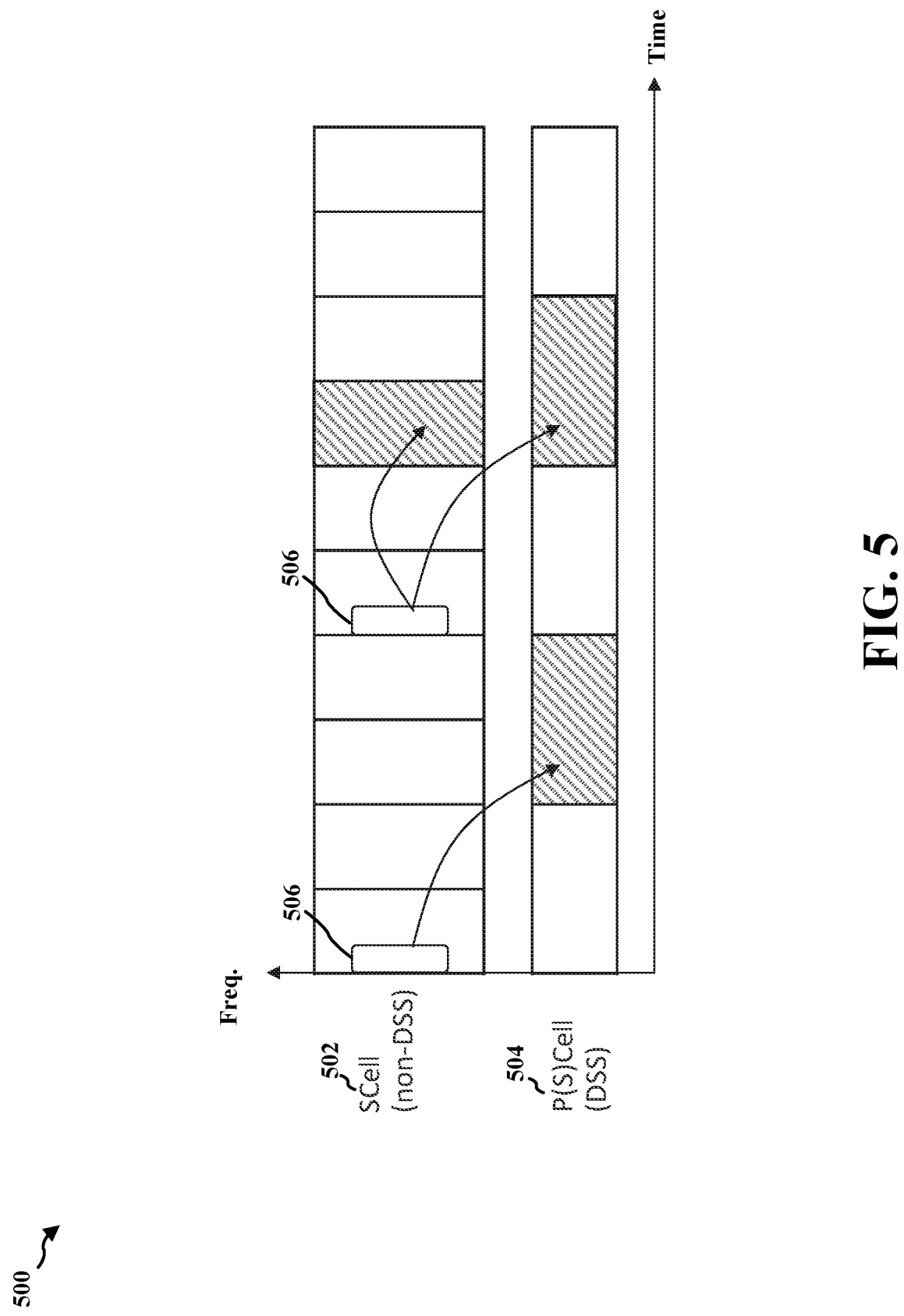
FIG. 5 is a diagram illustrating examples of cross carrier scheduling and/or joint scheduling.

FIG. 5 is another example 500 of cross carrier scheduling and/or joint scheduling. The P(S)Cell 504 may be a DSS carrier, and the SCell 502 may be a non-DSS carrier. The P(S)Cell 504 may use a subcarrier spacing (SCS) of 15 kHz, while the SCell 502 may use SCS of 30 kHz to accommodate the wider bandwidth. The DSS carrier P(S)Cell 504 may use the SCS of 15 kHz to align with the SCell 502. However, other SCS combinations may be possible. The P(S)Cell 504 may have uplink resources, while the SCell 502 may not be configured to have uplink resources (e.g., downlink only carrier aggregation). For example, the UE may be configured with carrier aggregation in the downlink, but single carrier configuration for the uplink. In some aspects, both the P(S)Cell 504 and the SCell 502 may operate in the same frequency range (e.g., frequency range (FR) 1). In some aspects, the SCell 502, the non-DSS carrier, may be a NR-U carrier. The PDCCH 506 may be configured to schedule a downlink or uplink transmission on the P(S) Cell 504. The PDCCH 506 may be configured to schedule multiple carriers (e.g., PDSCHs) on multiple cells using a single DCI, which may improve spectral efficiency by using a single DCI instead of multiple DCIs. The disclosure is not intended to be limited the aspects disclosed herein. The disclosure includes aspects wherein the non-DSS carrier is configured to schedule an uplink and/or downlink transmission on the DSS carrier. However, in some aspects, the DSS carrier may be configured as a scheduling carrier, such that the DSS carrier schedules an uplink and/or a downlink transmission on the non-DSS carrier. For example, in some aspects, the P(S)Cell may be the DSS carrier and may be configured to schedule an uplink and/or downlink transmission on the SCell, which may be the non-DSS carrier.

FIGS. 6A-6D are diagrams 600, 630, 640, 650 illustrating examples of DCI designs. In the example 600 of FIG. 6A, separate DCIs are configured for separate carriers. For example, DCI 602 for the first component carrier (CC) and DCI 604 for the second CC. Each DCI 602, 604 may have a number of fields inside. The example 600 of FIG. 6A is simplified such that each DCI 602, 604 comprise 5 fields (e.g., 606, 608, 610, 612, 614 for DCI 602; 616, 618, 620, 622, 624 for DCI 604). However, the disclosure is not intended to be limited to the aspects disclosed herein, such that the DCI may have more than 5 fields or less than 5 fields. The aspects shown in FIGS. 6A-6D show simplified examples and are not intended to be limited to such examples.

In the example 630 of FIG. 6B, the separate DCIs 602, 604 may be combined to form a DCI 632 for the first and second CCs, such that the fields for the DCI 602 are mapped first to the DCI 632 followed by the mapping of the fields for the DCI 604. In the example 640 of FIG. 6C, the separate DCIs 602, 604 may be combined to for a DCI 642 for the first and second CCs. The fields of the DCI 642 may be mapped in an interleaved configuration such that the first field 606 for the first CC is mapped first followed by the first field 616 for the second CC, followed by the second field 608 for the first CC, then followed by the second field 618 for the second CC, etc. This interleaved pattern continues until the respective fields of the combined DCIs are mapped. In either case, two sets of cyclic redundancy check (CRC) bits are not necessary and therefore, compared to transmitting two separate DCI formats for the two CCs, 630 and 640 can reduce the payload, thereby improving performance. The example 650 of FIG. 6D discloses a single DCI 652 for both the first and second CCs, such that the DCI 652 is reduced in size in comparison to separate DCIs.

FIG. 7 is a diagram 700 illustrating DCI formats. The diagram 700 includes the fields that may be included in the single DCI (e.g., DCI 652). The diagram 700 show fields for the single DCI format for a DCI 702 configured for cross carrier scheduling and a DCI 704 configured for joint scheduling. For each of the fields, there can be two options. The first option (e.g., DCI 702) may include separate fields for different scheduled CCs, such that the fields for the first CC and the second CC are included. In some aspects, one or more of the fields may be copied twice in the single DCI 702. This may allow the DCI 702 to schedule two PDSCHs on two CCs without any restrictions. The second option (e.g., DCI 704) may include joint fields, such that some or particular fields of the DCI 704 indicates the values for the first CC and the second CC jointly, such that the DCI 704 may not include duplicated fields. For example, with reference to FIG. 8, shows an example 800 of fields that may be considered as joint fields 802. In the example of FIG. 8, the frequency domain resource allocation (FDRA) mapping field and virtual resource block to physical resource block (VRB-to-PRB) mapping field may be joint fields, such that the value for the respective CCs are indicated. The disclosure is not intended to be limited to the aspects disclosed herein. In some aspects other DCI fields may be joint fields, and the disclosure is not intended to be limited to the FDRA and VRB-to-PRB mapping fields as being joint fields.

Figure 9:
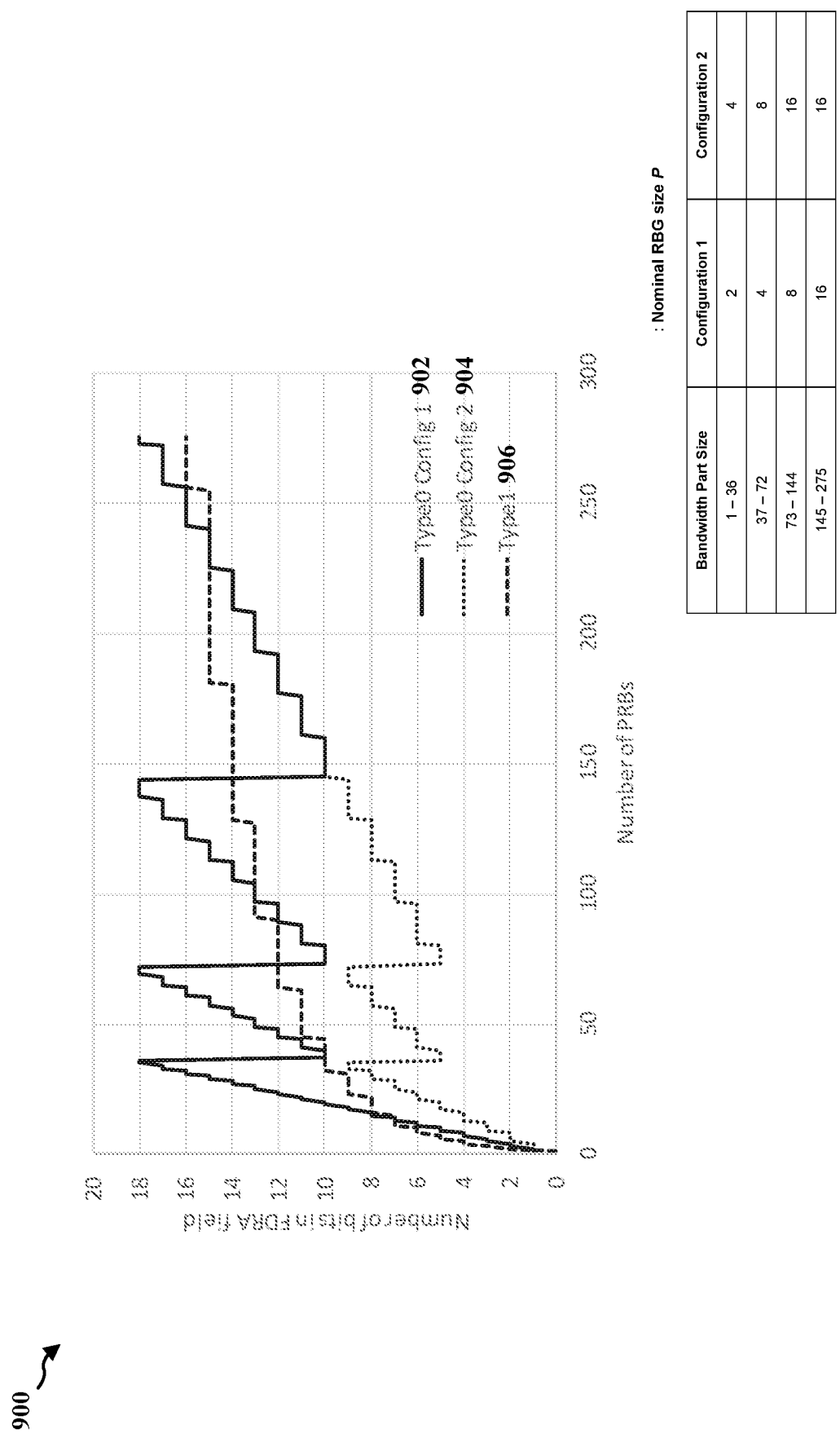
FIG. 9 is a diagram illustrating an example of a frequency domain resource allocation.

FIG. 9 is a diagram 900 illustrating an example of a FDRA. The field size of the FDRA may depend on a type configuration and a bandwidth. DCI may support two resource allocation (RA) types (e.g., Type0 and Type1), where RA Type0 may have two configurations. For Type0, the resource block (RB) group level bit map may be based on RA where the resource block group (RBG) granularity is configured by higher layers. In instances where a UE is configured with configuration 1 or Type0, then the RB group size may depend on the bandwidth part (BWP) size, for example, as shown in the table of FIG. 9. The resource allocation field is indicated using the bit map to which RB group the PDSCH is mapped. In order to reduce the DCI size, configuration 2, as shown in FIG. 9, may be utilized. Configuration 2 may use coarse granularity such that the number of RB groups in the bandwidth may be reduced and may contribute to the reduction of the FDRA field size.

For Type1, the contiguous allocation may be configured using a resource indication value (MV) indication (e.g., start RB, length) in the frequency domain, jointly. Type1 allows for contiguous allocation in the frequency domain which may contribute to the reduction of the DCI size. Type1 may also be configured to support VRB-to-PRB mapping, which may be a 1 bit indicator. In instance where the indicator field indicates VRB-to-PRB mapping for the PDSCH is scheduled with the RA Type1, then the VRB-to-PRB mapping is performed which may interleave data across the frequencies.

Figure 10:
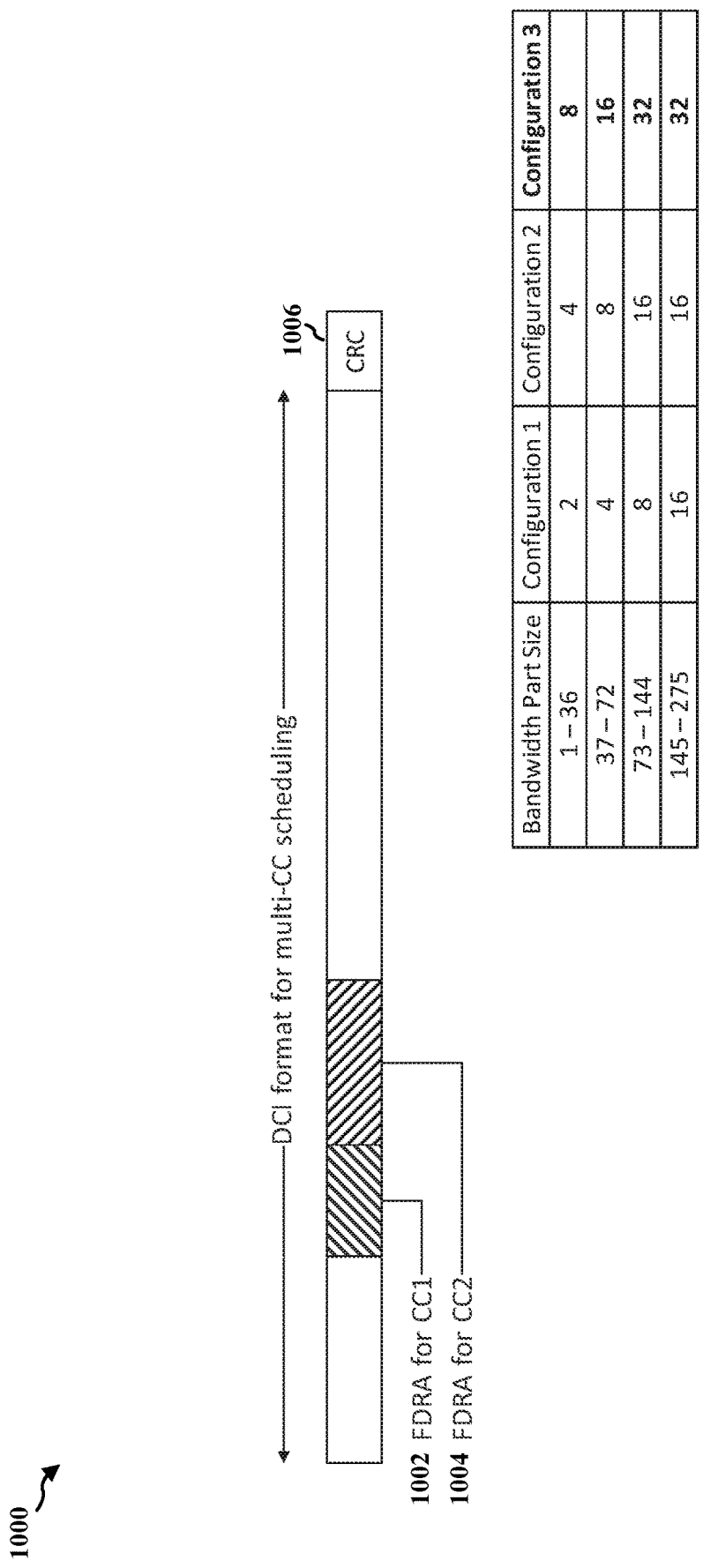
FIG. 10 is a diagram illustrating an example of a DCI format.

FIG. 10 is a diagram 1000 illustrating an example of a DCI format. In the aspect of FIG. 10 the DCI format may be configured for multi-CC scheduling, and may comprise two FDRA fields. The first FDRA field 1002 may correspond to the FDRA field for the first CC, and the second FDRA field 1004 may correspond to the FDRA field for the second CC. The number of bits for the FDRA fields 1002, 1004 may be determined by RRC higher layer configuration for the PDSCH in the first CC and the second CC, respectively. The first CC may have its own configuration and BWP as well as RA types. The number of bits for the FDRA field 1002 may be determined, based on the RRC higher layer configuration. In some aspects, the order of the FDRA fields 1002, 1004 may be based on the indexes of the respective CC. In some aspects, for RA Type0, a new configuration (e.g., Type0 configuration 3) may be defined in an effort to reduce the field size of the FDRA. The new configuration Type0 configuration 3 may have an increased coarse granularity in comparison to configuration 1 and configuration 2. In the aspect of FIG. 10, the values of configuration 3 are doubled in comparison to configuration 2, which may assist in reducing the size of the DCI. The values of the new configuration 3 may be other values configured to increase the coarse granularity, and are not intended to be limited to twice the size of configuration 2. In some aspects, for RA Type1, the RBG concept may be utilized such that the RIV may indicate the start RBG and length, which may assist in reducing the FDRA field size for RA Type 1.

Figure 11A:
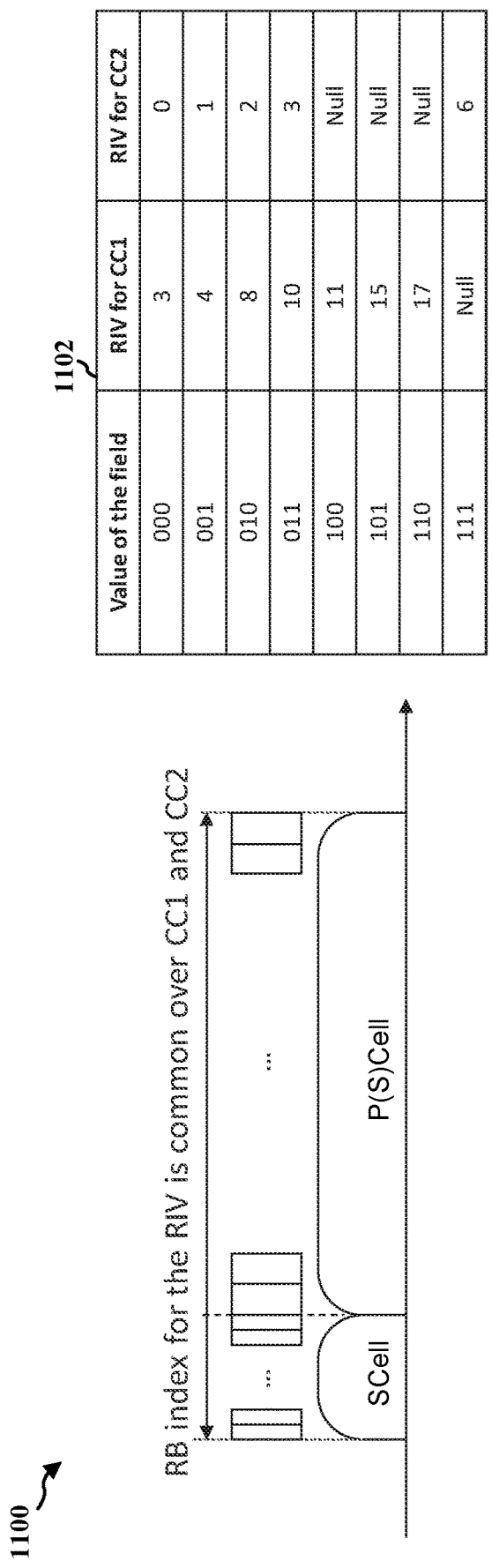
FIGS. 11A-11B are diagrams illustrating an example of resource allocation and DCI format.
Figure 11B:
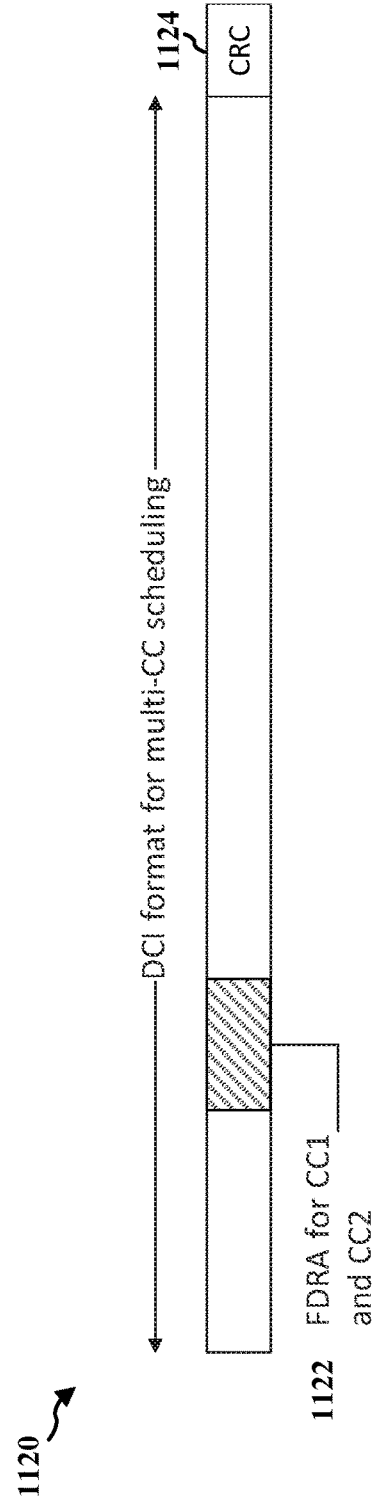

FIGS. 11A-11B are diagrams 1100, 1120 illustrating an example of RA and DCI format for joint fields. For example, the diagram 1100 discloses a jointly configured table 1102, wherein a field value for FDRAs (e.g., 1122) for the first CC (e.g., CC1) and the second CC (e.g., CC2) may be linked by RRC such that the FDRA is a joint FDRA. The joint FDRA may allow for The value of the field of the FDRA may be a three bit field that has 8 different values, (e.g., 000, 001, 010, 011, 100, 101, 110, 111), and each of 8 different FDRA values may correspond to a RIV for the first CC and the second CC. The values of for the first CC and second CC indicated in FIG. 11A are examples and the disclosure is not intended to be limited to such examples. As such, the MV for the first and second CCs may be different. In some aspects, the first or second CC may not have an MV corresponding to the three bit FDRA value, in such instances, the first or second CC may have a value of "null" for the MV. As such, the value of the FDRA may still provide the resource allocation for the CC, based on the FDRA value. For example, with reference to FIG. 11A, the FDRA value of "111" results in the MV for the first CC being "null", while the MV for the second CC is "6", where the "null" indicates that data is not scheduled for the first CC while data is scheduled for the second CC. The number of FDRA bits may be determined by the maximum number of configured FDRAs for the first CC and the number of configured FDRAs for the second CC. For example, if one or either of the first or second CC has a lesser number of entries in the table, then the size may depend on the larger size. The table 1102 of FIG. 11A shows "MV", however, in some aspects, it is possible to use RA Type0 in which case each of the entries may have a bit map.

In some aspects, a common RIV across CC, wherein the two CCs are treated as if they are a contiguous single carrier. The MV field may indicate the start of the RB within the first CC and the second CC, as well as the length that may span across the two CCs. In some aspects, a transport block may not be mapped across the two CCs. The transport block sizes may be calculated based on the resulting FDRA per CC, and the transport blocks may be mapped in the first CC and the second CC, respectively. For example, as shown in FIG. 11A, the SCell and the P(S)Cell are two carriers, but the UE may treat them as a single carrier. Each of the SCell and P(S)Cell may have respective MV indicators and they may be considered as contiguous. In some aspects, the SCell and P(S)Cell may use the same or different SCS. Based on the indexing across the first and second CCs, the RIV indication may indicate the scheduled PDCCH.

In some aspects, one transport block may be mapped across the first CC and the second CC, where the FDRA may be determined by the common MV across the CCs. In such aspects, some parameters (e.g., SCS) may be different across the first CC and the second CC. The UE may determine acknowledge (ACK) or non-acknowledge (NACK) based on the decoding result of the transport block spanning across the first CC and the second CC. The UE may generate an ACK/NACK bit and report to the network. The UE PDSCH processing timeline may be determined based on the largest required timeline between the first CC and the second CC. In some aspects, the maximum number of RBs the transport block can span may not exceed 275. In some aspects, the maximum bandwidth the transport block may span may not exceed 100 MHz. In some aspects, the maximum transport block size may not be more than the maximum transport block size if the UE is operated with a single CC.

Figure 12A:
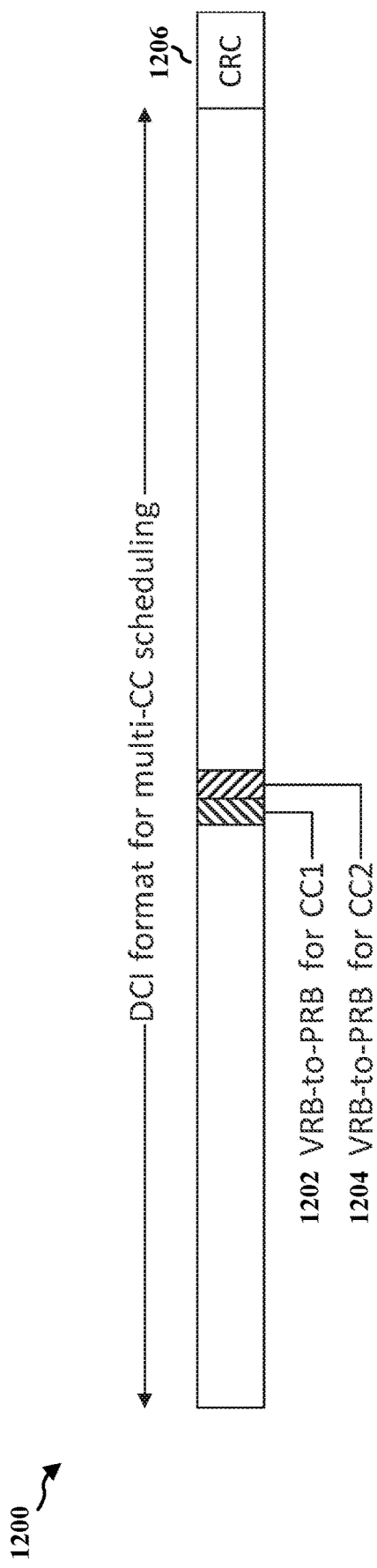
FIGS. 12A-12B are diagrams illustrating an example of a DCI.
Figure 12B:
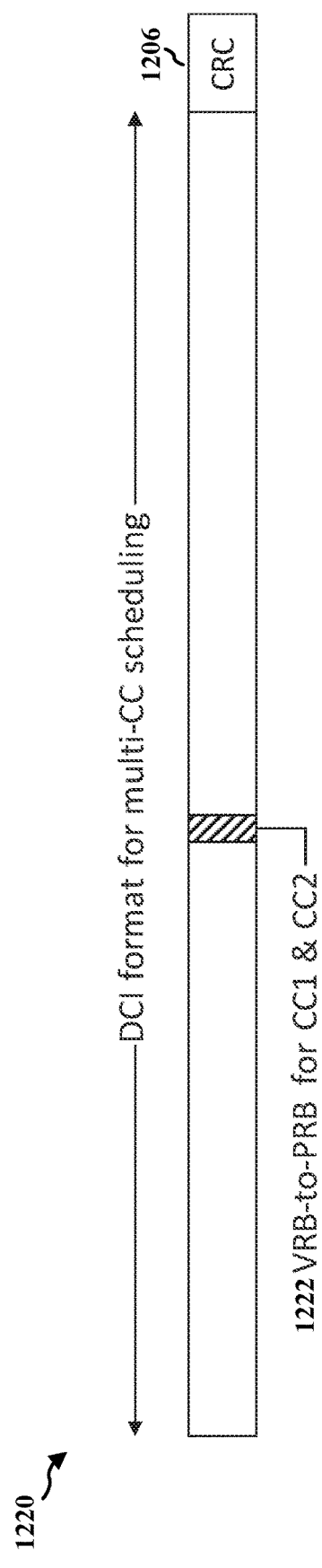

FIGS. 12A-12B are diagrams 1200, 1220 illustrating an example of DCI formats for separate and joint fields. The diagram 1200 of FIG. 12A may comprise up to two bits in the DCI for multi-CC scheduling, based on the assumption that the number of scheduled CCs is 2. The DCI may include a VRB-to-PRB mapping field 1202 for the first CC, and may include a VRB-to-PRB mapping field 1204 for the second CC. In some aspects, a 1 bit field may be used for RA Type1 and interleaved VRB-to-PRB mapping is configured for the particular CC. The diagram 1220 of FIG. 12B may comprise a one bit VRB-to-PRB mapping field 1222 if either or both of the CCs are RA Type1 and configured with interleaved VRB-to-PRB mapping. In some aspects, if both CCs are RA Type1 and configured with interleaved VRB-to-PRB, then the one bit VRB-to-PRB mapping field may be applied to both of the CCs. In some aspects, if one of the CCs is RA Type1 and configured with interleaved VRB-to-PRB, then the one bit VRB-to-PRB mapping field may be applied to the particular CC that is RA Type1 and configured with interleaved VRB-to-PRB.

Figure 13:
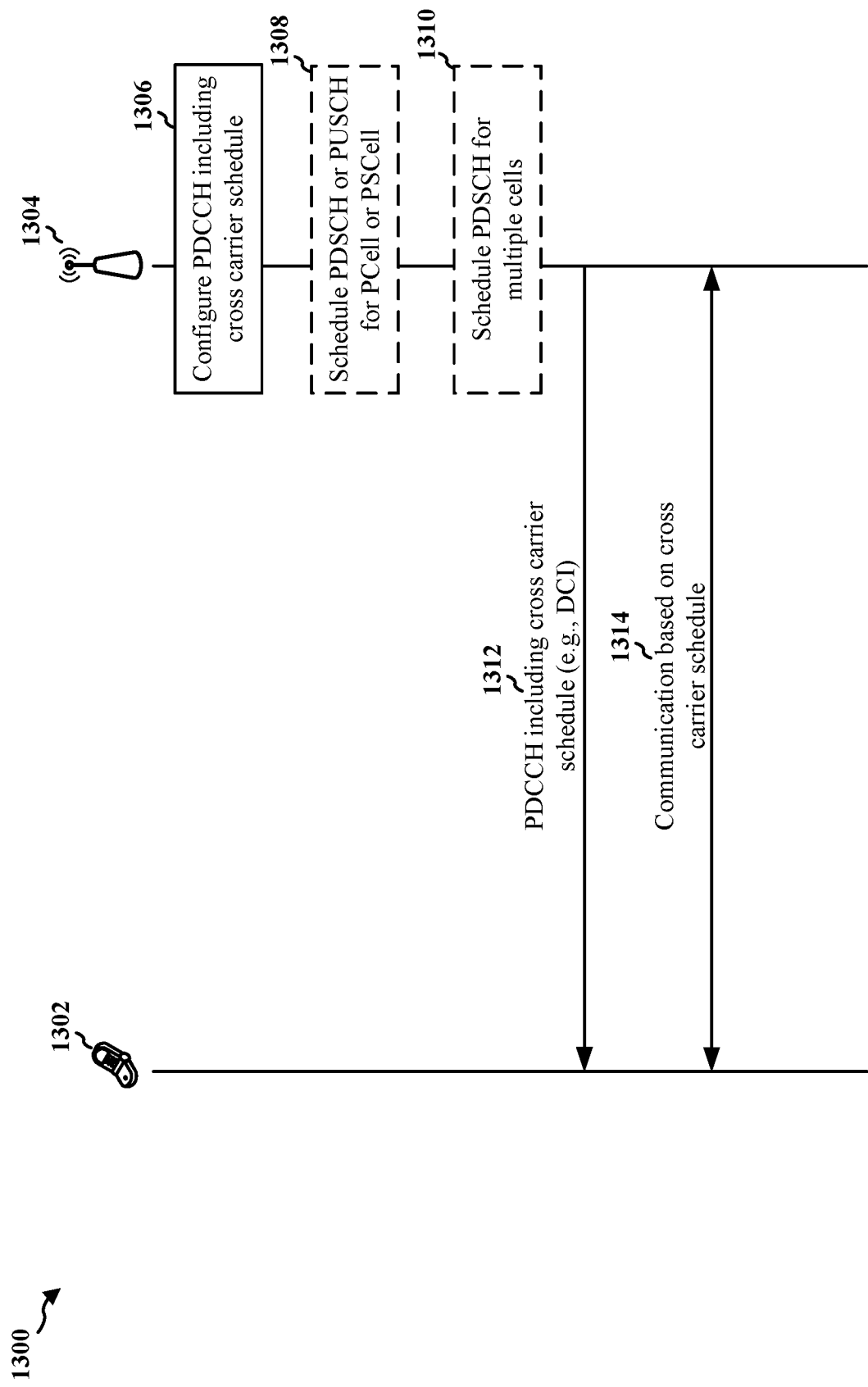
FIG. 13 is a call flow diagram of signaling between a UE and a base station in accordance with certain aspects of the disclosure.

FIG. 13 is a call flow diagram 1300 of signaling between a UE 1302 and a base station 1304. The base station 1304 may be configured to provide at least one cell. The UE 1302 may be configured to communicate with the base station 1304. For example, in the context of FIG. 1, the base station 1304 may correspond to base station 102/180 and, accordingly, the cell may include a geographic coverage area 110 in which communication coverage is provided and/or small cell 102' having a coverage area 110'. Further, a UE 1302 may correspond to at least UE 104. In another example, in the context of FIG. 3, the base station 1304 may correspond to base station 310 and the UE 1302 may correspond to UE 350. Optional aspects are illustrated with a dashed line.

As illustrated at 1306, the base station 1304 may configure a cross carrier schedule. The base station may configure a PDCCH including the cross carrier schedule. The cross carrier schedule may include a schedule of an uplink transmission or a downlink transmission on more than one cell.

In some aspects, for example at 1308, to configure the PDCCH, the base station 1304 may schedule a PDSCH or a PUSCH for a PCell or a P(S)Cell. For example, 1404 may be performed by schedule component 1540 of apparatus 1502. In some aspects, the at least one cell may comprise an SCell. The DCI of the PDCCH of the SCell may schedule the PDSCH or the PUSCH for the P(S)Cell, as shown, for example in FIGS. 4A, 4B, and 5.

In some aspects, for example at 1310, to configure the PDCCH, the base station 1304 may schedule a PDSCH on multiple cells using the DCI. In some aspects, the more than one cell may comprise a P(S)Cell. The DCI of the PDCCH of the P(S)Cell may schedule the PDSCH for the multiple cells. In some aspects, the more than one cell may comprise an SCell. The DCI of the PDCCH of the SCell may schedule the PDSCH for the multiple cells. For example, in FIGS. 4A, 4B, and 5, the PDCCH 406, 506 may schedule the PDSCH for another cell (e.g., 404, 504).

As illustrated at 1312, the base station 1304 may transmit the PDCCH including the cross carrier schedule to the UE 1302. The UE 1302 may receive the PDCCH including the cross carrier schedule from the base station 1304. The PDCCH may comprise DCI configured to schedule the uplink transmission or the downlink transmission. The DCI may include at least one FDRA field indicating RBs for the uplink transmission or the downlink transmission. In some aspects, the DCI may include separate fields for the cross carrier schedule, as shown, for example, in FIGS. 6A-6D. The DCI may include fields for a serving cell and fields for another serving cell. In some aspects, the DCI may include joint fields that may be shared between a serving cell and another serving cell. The joint fields may comprise a FDRA field or a VRB-to-PRB mapping field, for example, as shown in FIGS. 12A-12B. A value of the FDRA field may be linked by a set of RBs where the scheduled PDSCHs may be on multiple carriers, where the set of RBs on the multiple carriers may be configured by RRC signaling. In some aspects, the VRB-to-PRB mapping field may be present if at least one component carrier of the serving cell or the another serving cell is configured with resource allocation (RA) type 1 and with interleaved VRB-to-PRB. In some aspects, the DCI may include two bits for the cross carrier schedule, as shown, for example in FIG. 12A. In some aspects, a first bit may be a VRB-to-PRB mapping field for a first carrier, and a second bit may be a VRB-to-PRB mapping field for a second carrier.

As illustrated at 1314, the base station 1304 and the UE 1302 may communicate with each other. The base station 1304 and UE 1302 may communicate with each other based on the cross carrier schedule configured by the DCI.

Figure 14:
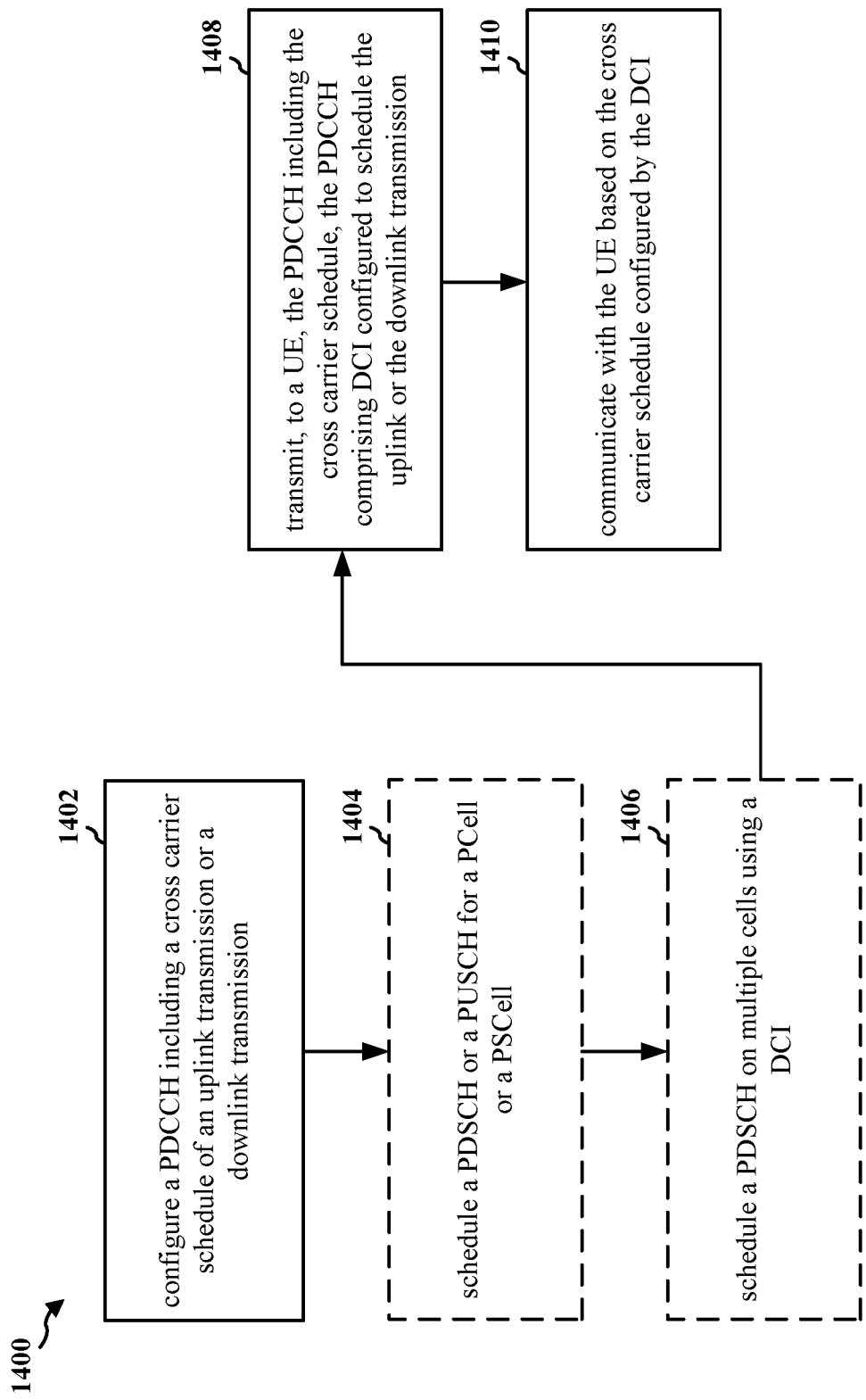
FIG. 14 is a flowchart of a method of wireless communication.

FIG. 14 is a flowchart 1400 of a method of wireless communication. The method may be performed by a base station or a component of a base station (e.g., the base station 102/180; the apparatus 1502; the baseband unit 1504, which may include the memory 376 and which may be the entire base station 310 or a component of the base station 310, such as the TX processor 316, the RX processor 370, and/or the controller/processor 375). One or more of the illustrated operations may be omitted, transposed, or contemporaneous. Optional aspects are illustrated with a dashed line. The method may allow a base station to schedule cross carrier scheduling of uplink and/or downlink transmissions using a single DCI.

At 1402, the base station may configure a PDCCH including a cross carrier schedule. For example, 1402 may be performed by schedule component 1540 of apparatus 1502. The cross carrier schedule may include a schedule of an uplink transmission or a downlink transmission on more than one cell. For example, with reference to FIG. 13, the base station 1304, at 1306, may configure a PDCCH including a cross carrier schedule.

In some aspect, for example at 1404, to configure the PDCCH, the base station may schedule a PDSCH or a PUSCH for a PCell or a P(S)Cell. For example, 1404 may be performed by schedule component 1540 of apparatus 1502. In some aspects, the at least one cell may comprise an SCell. The DCI of the PDCCH of the SCell may schedule the PDSCH or the PUSCH for the P(S)Cell, as shown, for example in FIGS. 4A, 4B, and 5. With reference to FIG. 13, for example, the base station 1304, at 1308, may schedule a PDSCH or a PUSCH for a PCell or a P(S)Cell.

In some aspects, for example at 1406, to configure the PDCCH, the base station may schedule a PDSCH on multiple cells using the DCI. For example, 1406 may be performed by schedule component 1540 of apparatus 1502. In some aspects, the more than one cell may comprise a P(S)Cell. The DCI of the PDCCH of the P(S)Cell may schedule the PDSCH for the multiple cells. In some aspects, the more than one cell may comprise an SCell. The DCI of the PDCCH of the SCell may schedule the PDSCH for the multiple cells. For example, in FIGS. 4A, 4B, and 5, the PDCCH 406, 506 may schedule the PDSCH for another cell (e.g., 404, 504). With reference to FIG. 13, for example, the base station 1304, at 1310, may schedule PDSCH for the multiple cells.

At 1408, the base station may transmit the PDCCH including the cross carrier schedule. For example, 1408 may be performed by PDCCH component 1542 of apparatus 1502. The base station may transmit the PDCCH including the cross carrier schedule to a UE. The PDCCH may comprise DCI configured to schedule the uplink transmission or the downlink transmission. With reference to FIG. 13, the base station 1304 may transmit the PDCCH 1312 including the cross carrier schedule to the UE 1302. The DCI may include at least one FDRA field indicating RBs for the uplink transmission or the downlink transmission. In some aspects, the DCI may include separate fields for the cross carrier schedule, as shown, for example, in FIGS. 6A-6D. The DCI may include fields for a serving cell and fields for another serving cell. In some aspects, the DCI may include joint fields that may be shared between a serving cell and another serving cell. The joint fields may comprise a FDRA field or a VRB-to-PRB mapping field, for example, as shown in FIGS. 12A-12B. A value of the FDRA field may be linked by a set of RBs where the scheduled PDSCHs may be on multiple carriers, where the set of RBs on the multiple carriers may be configured by RRC signaling. In some aspects, the VRB-to-PRB mapping field may be present if at least one component carrier of the serving cell or the another serving cell is configured with resource allocation (RA) type 1 and with interleaved VRB-to-PRB. In some aspects, the DCI may include two bits for the cross carrier schedule, as shown, for example in FIG. 12A. In some aspects, a first bit may be a VRB-to-PRB mapping field for a first carrier, and a second bit may be a VRB-to-PRB mapping field for a second carrier.

At 1410, the base station may communicate with the UE. For example, 1410 may be performed by communication component 1544 of apparatus 1502. The base station may communicate with the UE based on the cross carrier schedule configured by the DCI. For example, with reference to FIG. 13, the base station 1304 and UE 1302, at 1314, may communicate with each other based on the cross carrier schedule.

Figure 15:
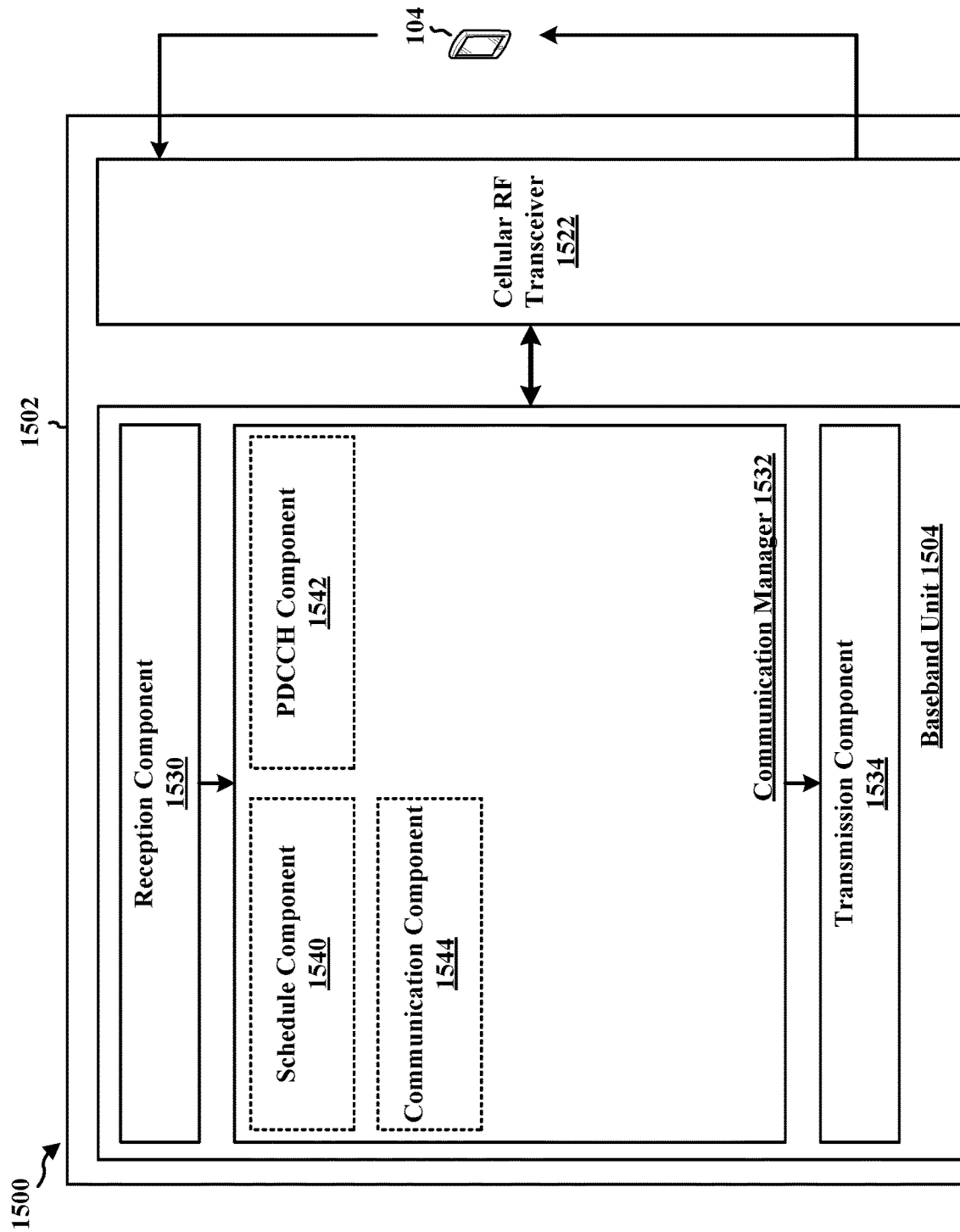
FIG. 15 is a diagram illustrating an example of a hardware implementation for an example apparatus.

FIG. 15 is a diagram 1500 illustrating an example of a hardware implementation for an apparatus 1502. The apparatus 1502 is a BS and includes a baseband unit 1504. The baseband unit 1504 may communicate through a cellular radio frequency (RF) transceiver 1522 with the UE 104. The baseband unit 1504 may include a computer-readable medium/memory. The baseband unit 1504 is responsible for general processing, including the execution of software stored on the computer-readable medium/memory. The software, when executed by the baseband unit 1504, causes the baseband unit 1504 to perform the various functions described supra. The computer-readable medium/memory may also be used for storing data that is manipulated by the baseband unit 1504 when executing software. The baseband unit 1504 further includes a reception component 1530, a communication manager 1532, and a transmission component 1534. The communication manager 1532 includes the one or more illustrated components. The components within the communication manager 1532 may be stored in the computer-readable medium/memory and/or configured as hardware within the baseband unit 1504. The baseband unit 1504 may be a component of the BS 310 of FIG. 3 and may include the memory 376 and/or at least one of the TX processor 316, the RX processor 370, and the controller/processor 375. The transmission component 1534 of apparatus 1502 of FIG. 15 may correspond to the TX processor 316 of BS 310 of FIG. 3. The reception component 1530 of apparatus 1502 of FIG. 15 may correspond to the RX processor 370 of the BS 310 of FIG. 3.

The communication manager 1532 includes a schedule component 1540 that may configure a PDCCH including a cross carrier schedule, e.g., as described in connection with 1402 of FIG. 14. The schedule component 1540 may be configured to schedule a PDSCH or a PUSCH for a PCell or a P(S)Cell, e.g., as described in connection with 1404 of FIG. 14. The schedule component 1540 may be configured to schedule a PDSCH on multiple cells using the DCI, e.g., as described in connection with 1406 of FIG. 14. The communication manager 1532 further includes a PDCCH component 1542 that may transmit the PDCCH including the cross carrier schedule, e.g., as described in connection with 1408 of FIG. 14. The communication manager 1532 further includes a communication component 1544 that may communicate with the UE, e.g., as described in connection with 1410 of FIG. 14.

The apparatus may include additional components that perform each of the blocks of the algorithm in the aforementioned flowchart of FIG. 14. As such, each block in the aforementioned flowchart of FIG. 14 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

In one configuration, the apparatus 1502, and in particular the baseband unit 1504, includes means for configuring a PDCCH including a cross carrier schedule of an uplink transmission or a downlink transmission on more than one cell. The apparatus includes means for transmitting, to a UE, the PDCCH including the cross carrier schedule, the PDCCH comprising DCI configured to schedule the uplink transmission or the downlink transmission. The apparatus includes means for communicating with the UE based on the cross carrier schedule configured by the DCI. The apparatus further includes means for scheduling a PDSCH or a PUSCH for a PCell or a P(S)Cell. The apparatus further includes means for scheduling PDSCH on multiple cells using the DCI. The aforementioned means may be one or more of the aforementioned components of the apparatus 1502 configured to perform the functions recited by the aforementioned means. As described supra, the apparatus 1502 may include the TX Processor 316, the RX Processor 370, and the controller/processor 375. As such, in one configuration, the aforementioned means may be the TX Processor 316, the RX Processor 370, and the controller/processor 375 configured to perform the functions recited by the aforementioned means.

Figure 16:
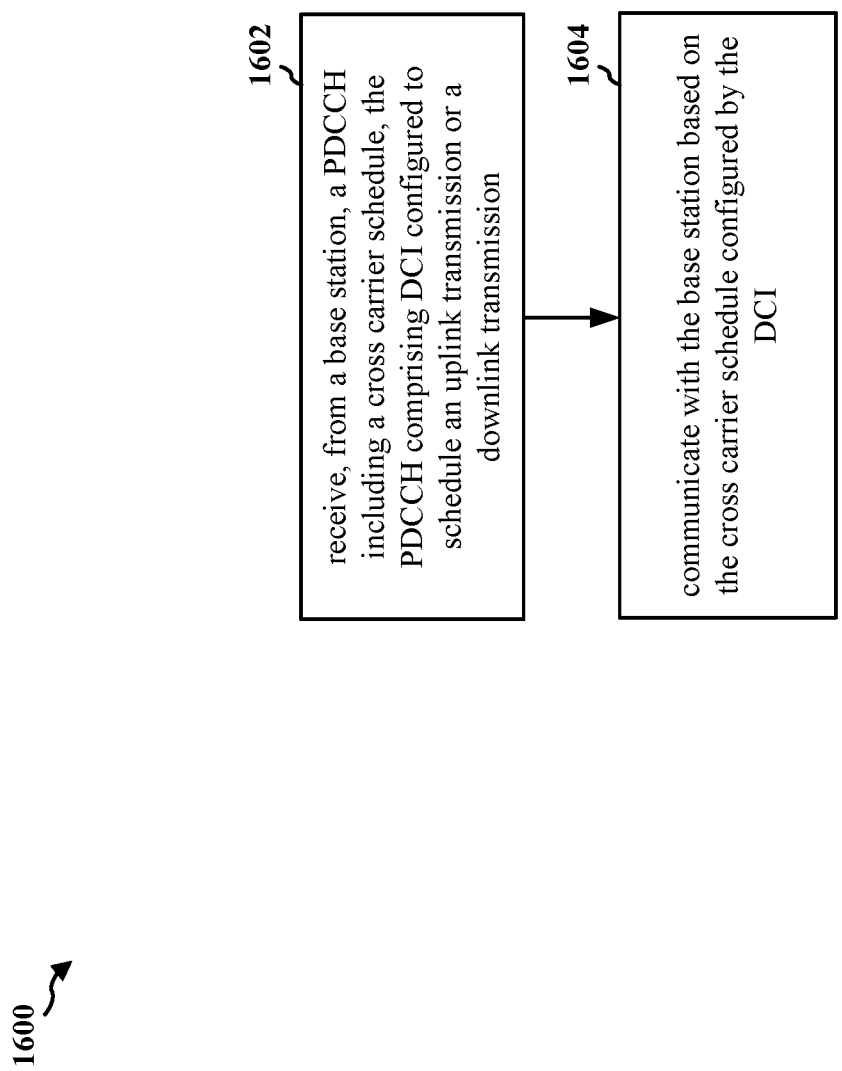
FIG. 16 is a flowchart of a method of wireless communication.

FIG. 16 is a flowchart 1600 of a method of wireless communication. The method may be performed by a UE or a component of a UE (e.g., the UE 104; the apparatus 1702; the cellular baseband processor 1704, which may include the memory 360 and which may be the entire UE 350 or a component of the UE 350, such as the TX processor 368, the RX processor 356, and/or the controller/processor 359). One or more of the illustrated operations may be omitted, transposed, or contemporaneous. Optional aspects are illustrated with a dashed line. The method may enable a UE to receive a cross carrier schedule configured to schedule an uplink transmission or a downlink transmission on more than one cell.

At 1602, the UE may receive a PDCCH including a cross carrier schedule. For example, 1602 may be performed by schedule component 1740 of apparatus 1702. The UE may receive the PDCCH including the cross carrier schedule from a base station. For example, with reference to FIG. 13, the UE 1302 may receive from the base station 1304 a PDCCH 1312 including the cross carrier schedule. The PDCCH may comprise DCI configured to schedule an uplink transmission or a downlink transmission on more than one cell. In some aspects, the PDCCH may schedule a PDSCH or a PUSCH for a PCell or a P(S)Cell. In some aspects, the PDCCH of an SCell may schedule the PDSCH or the PUSCH for the P(S)Cell. In some aspects, the PDCCH may schedule a PDSCH on multiple cells using the DCI. In some aspects, the PDCCH of a P(S)Cell may schedule the PDSCH for the multiple cells. In some aspects, the PDCCH of an SCell may schedule the PDSCH for the multiple cells. In some aspects, the DCI may include separate fields for the cross carrier schedule, as shown, for example, in FIGS. 6A-6D. The DCI may include fields for a serving cell and fields for another serving cell. The DCI may include joint fields that may be shared between the serving cell and another serving cell. In some aspects, the joint fields may comprise a frequency domain resource allocation (FDRA) field, for example, as shown in FIGS. 12A-12B. In some aspects, the joint fields may comprise a VRB-to-PRB mapping field, for example, as shown in FIGS. 12A-12B. In some aspects, a value of the FDRA field may be linked by a set of resource blocks (RBs) where the scheduled PDSCHs are on multiple carriers. The set of RBs on the multiple carriers may be configured by RRC signaling. In some aspects, the VRB-to-PRB mapping field may be present if at least one component carrier of the serving cell or the another serving cell is configured with a resource allocation (RA) type 1 and with an interleaved VRB-to-PRB. In some aspects, the DCI may include two bits for the cross carrier schedule, as shown, for example in FIG. 12A. For example, a first bit may correspond to a VRB-to-PRB mapping field for a first carrier, and a second bit may correspond to a VRB-to-PRB mapping field for a second carrier.

At 1604, the UE may communicate with the base station. For example, 1604 may be performed by communication component 1742 of apparatus 1702. The UE may communicate with the base station based on the cross carrier schedule configured by the DCI. For example, with reference to FIG. 13, the UE 1302 and base station 1304, at 1314, may communicate with each other based on the cross carrier schedule.

Figure 17:
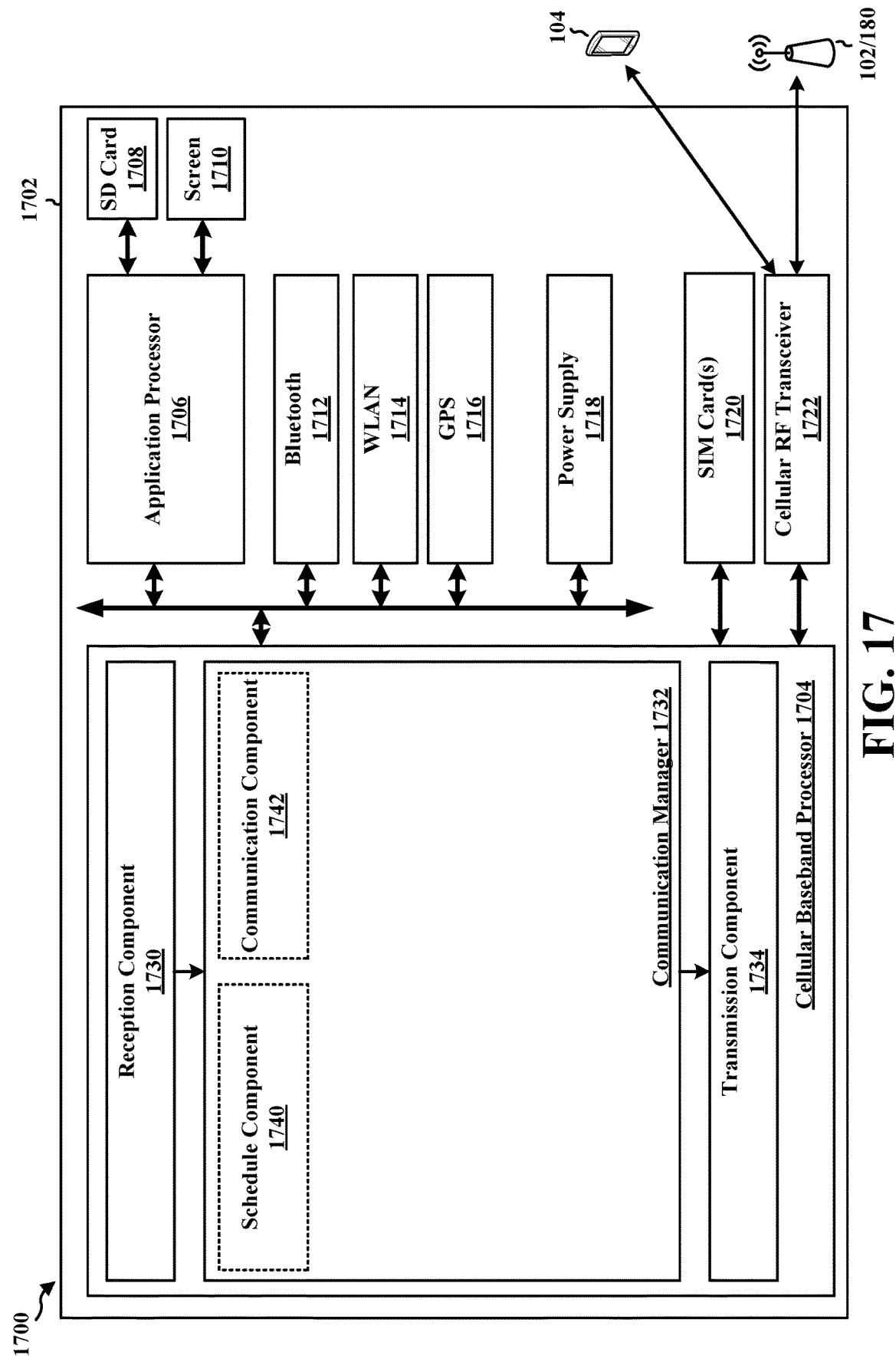
FIG. 17 is a diagram illustrating an example of a hardware implementation for an example apparatus.

FIG. 17 is a diagram 1700 illustrating an example of a hardware implementation for an apparatus 1702. The apparatus 1702 is a UE and includes a cellular baseband processor 1704 (also referred to as a modem) coupled to a cellular RF transceiver 1722 and one or more subscriber identity modules (SIM) cards 1720, an application processor 1706 coupled to a secure digital (SD) card 1708 and a screen 1710, a Bluetooth module 1712, a wireless local area network (WLAN) module 1714, a Global Positioning System (GPS) module 1716, and a power supply 1718. The cellular baseband processor 1704 communicates through the cellular RF transceiver 1722 with the UE 104 and/or BS 102/180. The cellular baseband processor 1704 may include a computer-readable medium/memory. The computer-readable medium/memory may be non-transitory. The cellular baseband processor 1704 is responsible for general processing, including the execution of software stored on the computer-readable medium/memory. The software, when executed by the cellular baseband processor 1704, causes the cellular baseband processor 1704 to perform the various functions described supra. The computer-readable medium/memory may also be used for storing data that is manipulated by the cellular baseband processor 1704 when executing software. The cellular baseband processor 1704 further includes a reception component 1730, a communication manager 1732, and a transmission component 1734. The communication manager 1732 includes the one or more illustrated components. The components within the communication manager 1732 may be stored in the computer-readable medium/memory and/or configured as hardware within the cellular baseband processor 1704. The cellular baseband processor 1704 may be a component of the UE 350 of FIG. 3 and may include the memory 360 and/or at least one of the TX processor 368, the RX processor 356, and the controller/processor 359. In one configuration, the apparatus 1702 may be a modem chip and include just the cellular baseband processor 1704, and in another configuration, the apparatus 1702 may be the entire UE (e.g., see 350 of FIG. 3) and include the aforediscussed additional modules of the apparatus 1702. The transmission component 1734 of apparatus 1702 of FIG. 17 may correspond to the TX processor 368 of UE 350 of FIG. 3. The reception component 1730 of apparatus 1702 of FIG. 17 may correspond to the RX processor 356 of UE 350 of FIG. 3.

The communication manager 1732 includes a schedule component 1740 that is configured to receive a PDCCH including a cross carrier schedule, e.g., as described in connection with 1602 of FIG. 16. The communication manager 1732 further includes a communication component 1742 that is configured to communicate with the base station, e.g., as described in connection with 1604 of FIG. 16.

The apparatus may include additional components that perform each of the blocks of the algorithm in the aforementioned flowchart of FIG. 16. As such, each block in the aforementioned flowchart of FIG. 16 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

In one configuration, the apparatus 1702, and in particular the cellular baseband processor 1704, includes means for receiving, from a base station, a PDCCH including a cross carrier schedule, the PDCCH comprising DCI configured to schedule an uplink transmission or a downlink transmission on more than one cell. The apparatus includes means for communicating with the base station based on the cross carrier schedule configured by the DCI. The aforementioned means may be one or more of the aforementioned components of the apparatus 1702 configured to perform the functions recited by the aforementioned means. As described supra, the apparatus 1702 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

Aspects provided herein provide a configuration to configure a cross carrier schedule of uplink transmission or downlink transmission on more than one cell. For example, a base station may configure an enhanced PDCCH to include a cross carrier schedule for uplink transmission or downlink transmission on more than one cell. In some aspects, the enhanced PDCCH, associated with a first cell, may be configured to schedule PDSCH or PUSCH for a second cell. In some aspects, the enhanced PDCCH may schedule the cross carrier schedule on more than one cell using a single DCI. At least one advantage of the disclosure is that the single DCI may schedule data channels on multiple carriers at one time, which may improve spectral efficiency.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The following examples are illustrative only and may be combined with aspects of other embodiments or teachings described herein, without limitation.

Aspect 1 is a method of wireless communication at a base station comprising transmitting, to a UE, a PDCCH including the cross carrier schedule, the PDCCH comprising DCI configured to schedule an uplink transmission or a downlink transmission, the DCI including at least one FDRA field indicating RBs for the uplink transmission or the downlink transmission on more than one cell; and communicating with the UE based on the cross carrier schedule configured by the DCI.

In Aspect 2, the method of Aspect 1 further includes that the more than one cell comprises an SCell, where configuring the PDCCH further includes scheduling a PDSCH or a PUSCH for a PSCell using the DCI of the PDCCH of the SCell.

In Aspect 3, the method of Aspect 1 or 2 further includes that the more than one cell comprises a PSCell or an SCell, where the configuring the PDCCH further includes scheduling a PDSCH on multiple cells using the DCI of the PDCCH of the PSCell, or scheduling the PDSCH on multiple cells using the DCI of the PDCCH of the SCell.

In Aspect 4, the method of any of Aspects 1-3 further includes configuring the PDCCH including the cross carrier schedule of the uplink transmission or the downlink transmission on the more than one cell.

In Aspect 5, the method of any of Aspects 1-4 further includes that the DCI includes separate FDRA fields for the cross carrier schedule.

In Aspect 6, the method of any of Aspects 1-5 further includes that the DCI includes at least one FDRA field for a serving cell and at least one FDRA field for another serving cell.

In Aspect 7, the method of any of Aspects 1-6 further includes that the DCI includes two bits for the cross carrier schedule.

In Aspect 8, the method of any of Aspects 1-7 further includes that a first bit is a VRB-to-PRB mapping field for a first carrier, and a second bit is a VRB-to-PRB mapping field for a second carrier.

In Aspect 9, the method of any of Aspects 1-8 further includes that the DCI includes joint FDRA fields that are shared between a serving cell and another serving cell.

In Aspect 10, the method of any of Aspects 1-9 further includes that the joint FDRA fields comprise a VRB-to-PRB mapping field.

In Aspect 11, the method of any of Aspects 1-10 further includes that a value of the at least one FDRA field is linked by a set of RBs where scheduled PDSCHs are on multiple carriers, where the set of RBs on the multiple carriers is configured by RRC signaling.

In Aspect 12, the method of any of Aspects 1-10 further includes that the VRB-to-PRB mapping field is present if at least one component carrier of the serving cell or the another serving cell is configured with RA type 1 and with interleaved VRB-to-PRB.

Aspect 13 is a device including a transceiver, one or more processors, and one or more memories in electronic communication with the one or more processors and storing instructions executable by the one or more processors to cause the device to implement a method as in any of Aspects 1-12.

Aspect 14 is a system or apparatus including means for implementing a method or realizing an apparatus as in any of Aspects 1-12.

Aspect 15 is a non-transitory computer readable storage medium storing instructions executable by one or more processors to cause the one or more processors to implement a method as in any of Aspect 1-12.

Aspect 16 is a method of wireless communication at a UE comprising receiving, from a base station, a PDCCH including a cross carrier schedule, the PDCCH comprising DCI configured to schedule an uplink transmission or a downlink transmission, the DCI including at least one FDRA field indicating RBs for the uplink transmission or the downlink transmission on more than one cell; and communicating with the base station based on the cross carrier schedule configured by the DCI.

In Aspect 17, the method of Aspect 16 further includes that the PDCCH of an SCell schedules a PDSCH or a PUSCH for a PSCell.

In Aspect 18, the method of Aspect 16 or 17 further includes that the PDCCH of a PSCell schedules the PDSCH on multiple cells using the DCI, or the PDCCH of an SCell schedules the PDSCH on multiple cells using the DCI.

In Aspect 19, the method of any of Aspects 16-18 further includes that the DCI includes separate FDRA fields for the cross carrier schedule.

In Aspect 20, the method of any of Aspects 16-19 further includes that the DCI includes at least one FDRA field for a serving cell and at least one FDRA field for another serving cell.

In Aspect 21, the method of any of Aspects 16-20 further includes that the DCI includes two bits for the cross carrier schedule.

In Aspect 22, the method of any of Aspects 16-21 further includes that a first bit is a VRB-to-PRB mapping field for a first carrier, and a second bit is a VRB-to-PRB mapping field for a second carrier.

In Aspect 23, the method of any of Aspects 16-22 further includes that the DCI includes joint FDRA fields that are shared between a serving cell and another serving cell.

In Aspect 24, the method of any of Aspects 16-23 further includes that the joint FDRA fields comprise a VRB-to-PRB mapping field.

In Aspect 25, the method of any of Aspects 16-24 further includes that a value of the at least one FDRA field is linked by a set of RBs where scheduled PDSCHs are on multiple carriers, where the set of RBs on the multiple carriers is configured by RRC signaling.

In Aspect 26, the method of any of Aspects 16-25 further includes that the VRB-to-PRB mapping field is present if at least one component carrier of the serving cell or the another serving cell is configured with RA type 1 and with interleaved VRB-to-PRB.

Aspect 27 is a device including a transceiver, one or more processors, and one or more memories in electronic communication with the one or more processors and storing instructions executable by the one or more processors to cause the device to implement a method as in any of Aspects 16-26.

Aspect 28 is a system or apparatus including means for implementing a method or realizing an apparatus as in any of Aspects 16-26.

Aspect 29 is a non-transitory computer readable storage medium storing instructions executable by one or more processors to cause the one or more processors to implement a method as in any of Aspect 16-26.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Terms such as "if," "when," and "while" should be interpreted to mean "under the condition that" rather than imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method of wireless communication at a base station, comprising:
    transmitting, to a user equipment (UE), a physical downlink control channel (PDCCH) including a cross carrier schedule, the PDCCH comprising downlink control information (DCI) configured to schedule an uplink transmission or a downlink transmission, the DCI including at least a frequency domain resource allocation (FDRA) field indicating resource blocks (RBs) for the uplink transmission or the downlink transmission on at least a first serving cell and a second serving cell wherein the FDRA field indicates the cross carrier schedule or the DCI including a virtual resource block to physical resource block (VRB-to-PRB) mapping field comprising a first bit for a first carrier and a second bit for a second carrier; and
    communicating with the UE based on the cross carrier schedule configured by the DCI.

2. The method of claim 1, wherein at least the first serving cell or the second serving cell comprises a secondary cell (SCell), wherein configuring the PDCCH comprises:
    scheduling a physical downlink shared channel (PDSCH) or a physical uplink shared channel (PUSCH) for a primary secondary cell (PSCell) using the DCI of the PDCCH of the SCell.

3. The method of claim 1, wherein at least the first serving cell or the second serving cell comprises a primary secondary cell (PSCell) or a secondary cell (SCell), wherein configuring the PDCCH comprises:
    scheduling a physical downlink shared channel (PDSCH) on multiple cells using the DCI of the PDCCH of the PSCell, or
    scheduling the PDSCH on multiple cells using the DCI of the PDCCH of the SCell.

4. The method of claim 1, further comprising:
    configuring the PDCCH including the cross carrier schedule of the uplink transmission or the downlink transmission on at least the first serving cell or the second serving cell.

5. The method of claim 1, wherein the DCI includes two bits for the cross carrier schedule, the two bits comprising the first bit and the second bit.

6. The method of claim 1, wherein the DCI includes joint FDRA fields that are shared between a serving cell and another serving cell.

7. The method of claim 6, wherein the joint FDRA fields comprise the VRB-to-PRB mapping field.

8. A method of wireless communication at a base station, comprising:
    transmitting, to a user equipment (UE), a physical downlink control channel (PDCCH) including a cross carrier schedule, the PDCCH comprising downlink control information (DCI) configured to schedule an uplink transmission or a downlink transmission, wherein the DCI includes joint frequency domain resource allocation (FDRA) fields that are shared between a serving cell and another serving cell and indicate the cross carrier schedule, wherein the joint FDRA fields comprise a virtual resource block to physical resource block (VRB-to-PRB) mapping field, wherein a value of the joint FDRA fields is linked by a set of RBs where scheduled physical downlink shared channels (PDSCHs) are on multiple carriers, where the set of RBs on the multiple carriers is configured by radio resource control (RRC) signaling; and
    communicating with the UE based on the cross carrier schedule configured by the DCI.

9. A method of wireless communication at a base station, comprising:
    transmitting, to a user equipment (UE), a physical downlink control channel (PDCCH) including a cross carrier schedule, the PDCCH comprising downlink control information (DCI) configured to schedule an uplink transmission or a downlink transmission, wherein the DCI includes joint frequency domain resource allocation (FDRA) fields that are shared between a serving cell and another serving cell and indicate the cross carrier schedule, wherein the joint FDRA fields comprise a virtual resource block to physical resource block (VRB-to-PRB) mapping field, wherein the VRB-to-PRB mapping field is present if at least one component carrier of the serving cell or the another serving cell is configured with resource allocation (RA) type 1 and with interleaved VRB-to-PRB; and
    communicating with the UE based on the cross carrier schedule configured by the DCI.

10. An apparatus for wireless communication at a base station, comprising:
    a memory;
    a transceiver; and
    at least one processor coupled to the memory and configured to:
        transmit, to a user equipment (UE) via the transceiver, a physical downlink control channel (PDCCH) including a cross carrier schedule, the PDCCH comprising downlink control information (DCI) configured to schedule an uplink transmission or a downlink transmission, the DCI including at least a frequency domain resource allocation (FDRA) field indicating resource blocks (RBs) for the uplink transmission or the downlink transmission on at least a first serving cell and a second serving cell wherein the FDRA field indicates the cross carrier schedule or the DCI including a virtual resource block to physical resource block (VRB-to-PRB) mapping field comprising a first bit for a first carrier and a second bit for a second carrier; and communicate with the UE, via the transceiver, based on the cross carrier schedule configured by the DCI.

11. A method of wireless communication at a user equipment (UE), comprising:
receiving, from a base station, a physical downlink control channel (PDCCH) including a cross carrier schedule, the PDCCH comprising downlink control information (DCI) configured to schedule an uplink transmission or a downlink transmission, the DCI including at least a frequency domain resource allocation (FDRA) field indicating resource blocks (RBs) for the uplink transmission or the downlink transmission on at least a first serving cell and a second serving cell wherein the FDRA field indicates the cross carrier schedule or the DCI including a virtual resource block to physical resource block (VRB-to-PRB) mapping field comprising a first bit for a first carrier and a second bit for a second carrier; and
communicating with the base station based on the cross carrier schedule configured by the DCI.

12. The method of claim 11, wherein the PDCCH of a secondary cell (SCell) schedules a physical downlink shared channel (PDSCH) or a physical uplink shared channel (PUSCH) for a primary secondary cell (PSCell).

13. The method of claim 11, wherein
the PDCCH of a primary secondary cell (PSCell) schedules a physical downlink shared channel (PDSCH) on multiple cells using the DCI, or
the PDCCH of a secondary cell (SCell) schedules the PDSCH on the multiple cells using the DCI.

14. The method of claim 11, wherein the DCI includes at least one FDRA field for a serving cell and at least one FDRA field for another serving cell.

15. The method of claim 11, wherein the DCI includes two bits for the cross carrier schedule, the two bits comprising the first bit and the second bit.

16. The method of claim 11, wherein the DCI includes joint FDRA fields that are shared between a serving cell and another serving cell.

17. The method of claim 16, wherein the joint FDRA fields comprise the VRB-to-PRB mapping field.

18. A method of wireless communication at a user equipment (UE), comprising:
receiving, from a base station, a physical downlink control channel (PDCCH) including a cross carrier schedule, the PDCCH comprising downlink control information (DCI) configured to schedule an uplink transmission or a downlink transmission, wherein the DCI includes joint frequency domain resource allocation (FDRA) fields that are shared between a serving cell and another serving cell and indicate the cross carrier schedule, wherein the joint FDRA fields comprise a virtual resource block to physical resource block (VRB-to-PRB) mapping field, wherein a value of the joint FDRA fields is linked by a set of RBs where scheduled physical downlink shared channels (PDSCHs) are on multiple carriers, where the set of RBs on the multiple carriers is configured by radio resource control (RRC) signaling; and
communicating with the base station based on the cross carrier schedule configured by the DCI.

19. A method of wireless communication at a user equipment (UE), comprising:
receiving, from a base station, a physical downlink control channel (PDCCH) including a cross carrier schedule, the PDCCH comprising downlink control information (DCI) configured to schedule an uplink transmission or a downlink transmission, wherein the DCI includes joint frequency domain resource allocation (FDRA) fields that are shared between a serving cell and another serving cell and indicate the cross carrier schedule, wherein the joint FDRA fields comprise a virtual resource block to physical resource block (VRB-to-PRB) mapping field, wherein the VRB-to-PRB mapping field is present if at least one component carrier of the serving cell or the another serving cell is configured with resource allocation (RA) type 1 and with interleaved VRB-to-PRB; and
communicating with the base station based on the cross carrier schedule configured by the DCI.

20. An apparatus for wireless communication at a user equipment (UE), comprising:
a memory;
a transceiver; and
at least one processor coupled to the memory and configured to:
receive, from a base station via the transceiver, a physical downlink control channel (PDCCH) including a cross carrier schedule, the PDCCH comprising downlink control information (DCI) configured to schedule an uplink transmission or a downlink transmission, the DCI including at least a frequency domain resource allocation (FDRA) field indicating resource blocks (RBs) for the uplink transmission or the downlink transmission on at least a first serving cell and a second serving cell wherein the FDRA field indicates the cross carrier schedule or the DCI including a virtual resource block to physical resource block (VRB-to-PRB) mapping field comprising a first bit for a first carrier and a second bit for a second carrier; and
communicate with the base station, via the transceiver, based on the cross carrier schedule configured by the DCI.

21. The apparatus of claim 20, wherein the PDCCH of a secondary cell (SCell) schedules a physical downlink shared channel (PDSCH) or a physical uplink shared channel (PUSCH) for a primary secondary cell (PSCell).

22. The apparatus of claim 20, wherein
the PDCCH of a primary secondary cell (PSCell) schedules a physical downlink shared channel (PDSCH) on multiple cells using the DCI, or
the PDCCH of a secondary cell (SCell) schedules the PDSCH on the multiple cells using the DCI.

23. The apparatus of claim 20, wherein the DCI includes at least one FDRA field for a serving cell and at least one FDRA field for another serving cell.

24. The apparatus of claim 20, wherein the DCI includes joint FDRA fields that are shared between a serving cell and another serving cell.

* * * * *